US 10,895,514 B2
(45) Date of Patent: Jan. 19, 2021

(12) United States Patent
Mathaes et al.

(54) DEVICE AND METHOD FOR CONTAINER CLOSURE INTEGRITY TESTING

(71) Applicant: Lonza Ltd, Visp (CH)

(72) Inventors: Roman Mathaes, Basel (CH); Anja Matter, Sissach (CH); Sarah Pelaez, Winterthur (CH); Hanns-Christian Mahler, Loerrach (DE); Atanas Koulov, Basel (CH); Benjamin Zucol, Basel (CH); Martin Vogt, Allschwil (CH); Lorenz Hochwallner, Puchenau (AT)

(73) Assignee: Lonza Ltd, Visp (CH)

( * ) Notice: Subject to any disclaimer, the term of this patent is extended or adjusted under 35 U.S.C. 154(b) by 0 days.

(21) Appl. No.: 16/646,720

(22) PCT Filed: Sep. 13, 2018

(86) PCT No.: PCT/EP2018/074731
§ 371 (c)(1),
(2) Date: Mar. 12, 2020

(87) PCT Pub. No.: WO2019/053121
PCT Pub. Date: Mar. 21, 2019

(65) Prior Publication Data
US 2020/0271541 A1 Aug. 27, 2020

Related U.S. Application Data

(60) Provisional application No. 62/558,503, filed on Sep. 14, 2017.

(30) Foreign Application Priority Data

Sep. 14, 2017 (EP) ..................................... 17191003
Apr. 18, 2018 (EP) ..................................... 18167981
(Continued)

(51) Int. Cl.
G01M 3/22 (2006.01)
G01M 3/32 (2006.01)
A61J 1/03 (2006.01)

(52) U.S. Cl.
CPC .......... G01M 3/229 (2013.01); G01M 3/3209 (2013.01); G01M 3/3281 (2013.01); *A61J 1/035* (2013.01)

(58) Field of Classification Search
CPC .... G01M 3/229; G01M 3/3281; G01M 3/329; G01M 3/3209; G01M 3/363
(Continued)

(56) References Cited

U.S. PATENT DOCUMENTS 3,465,572 A * 9/1969 Covert ................... G01M 3/24
73/49.2
5,205,157 A * 4/1993 McDaniel ........... G01M 3/3281
73/49.2
(Continued)

FOREIGN PATENT DOCUMENTS

DE 3927938 A1 * 2/1991 .......... G01M 3/3272
DE 102006047040 3/2008
(Continued)

OTHER PUBLICATIONS

Hanns-Christian Mahler, Container Closure Integrity Testing Practical Aspects and Approaches in the Pharmaceutical Industry, Lonza (Year: 2016).*
(Continued)

*Primary Examiner* — David L Singer
(74) *Attorney, Agent, or Firm* — Dority & Manning, P.A.

(57) ABSTRACT

Devices and methods for container closure integrity testing by leak testing, in particular of pharmaceutical containers, which are composed of two parts, the container itself, which shows an opening, and a closure system that is used to close
(Continued)

this opening of the container, such as a lid; and their application in quality control.

26 Claims, 20 Drawing Sheets

(30) Foreign Application Priority Data

Apr. 19, 2018 (EP) .................................... 18168137
May 3, 2018 (EP) .................................... 18170494
Jun. 14, 2018 (EP) .................................... 18177711

(58) Field of Classification Search
USPC .................................. 73/49.3, 52, 49.8, 49.2
See application file for complete search history.

(56) References Cited

U.S. PATENT DOCUMENTS

| | | | |
|---|---|---|---|
| 5,495,748 A * | 3/1996 | Brede | G01L 19/12 |
| | | | 73/40 |
| 6,018,987 A | 2/2000 | Mayer et al. | |
| 7,748,098 B2 * | 7/2010 | Hayes | G01M 13/005 |
| | | | 29/407.08 |
| 9,097,609 B1 | 8/2015 | Kelly | |
| 2007/0018646 A1 | 1/2007 | Hoath | |
| 2007/0113621 A1 | 5/2007 | Kanematsu et al. | |
| 2014/0290344 A1 | 10/2014 | Bongiglioli | |
| 2015/0089830 A1 * | 4/2015 | Wissner | B65B 7/2892 |
| | | | 34/284 |
| 2017/0108397 A1 | 4/2017 | Miller et al. | |
| 2017/0268945 A1 * | 9/2017 | Vogt | G01L 1/16 |

FOREIGN PATENT DOCUMENTS

| | | | | |
|---|---|---|---|---|
| DE | 102006047040 B3 * | 3/2008 | | G01M 3/229 |
| DE | 102017200850 A1 * | 7/2018 | | G01M 3/329 |
| EP | 2784465 | 10/2014 | | |
| EP | 3156778 | 4/2017 | | |
| FR | 1441963 | 6/1966 | | |
| FR | 2768224 | 3/1999 | | |
| GB | 2409724 | 7/2005 | | |
| JP | 2017106738 | 6/2017 | | |
| WO | WO9946572 | 9/1999 | | |
| WO | WO-03031944 A1 * | 4/2003 | | G01L 5/0038 |
| WO | WO2012020543 | 2/2012 | | |
| WO | WO2015108423 | 7/2015 | | |
| WO | WO-2016097210 A1 * | 6/2016 | | G01L 1/16 |

OTHER PUBLICATIONS

Mathaes et al, Impact of the Vial Capping Process on Residual Seal Force and Container Closure Integrity, Lonza (Year: 2016).*
International Preliminary Report for PCT/EP2018/074731 dated Dec. 6, 2019, 6 pages.
International Search Report for PCT/EP2018/074731 dated Feb. 8, 2019, 5 pages.
Written Opinion for PCT/EP2018/074731, 21 pages.

* cited by examiner (28)

(26)

(27)

(28)

(29)

(26)

(27)

DEVICE AND METHOD FOR CONTAINER CLOSURE INTEGRITY TESTING

CROSS REFERENCE TO RELATED APPLICATIONS

This application is the U.S. National Stage entry of International Application Number PCT/EP2018/074731 filed under the Patent Cooperation Treaty having a filing date of Sep. 13, 2018, which claims priority to European Patent Application No. 17191003.7 having a filing date of Sep. 14, 2017, European Patent Application No. 18167981.2 having a filing date of Apr. 18, 2018, European Patent Application No. 18168137.0 having a filing date of Apr. 19, 2018, European Patent Application No. 18170494.1 having a filing date of May 3, 2018, European Patent Application No. 18177711.1 having a filing date of Jun. 14, 2018, and U.S. Patent App. No. 62/558,503 having a filing date of Sep. 14, 2017, which are incorporated herein by reference.

BACKGROUND OF THE INVENTION

The invention discloses devices and methods for container closure integrity testing by leak testing, in particular of pharmaceutical containers, which are composed of two parts, the container itself, which shows an opening, and a closure system that is used to close this opening of the container, such as a lid; and their application in quality control.

The present invention is in the field of quality control. More precisely, the invention is in the field of pharmaceutical quality control. The present invention relates to devices and methods for container closure integrity testing, in particular of pharmaceutical containers.

Alejandra Nieto et al., PDA J Pharm Sci Technol, 2016, 70, 120-133, discloses the development of a novel method (ThermCCI) for direct assessment of CCI (container closure integrity) by a physical method (pCCI) at frozen conditions, using a modified He-leakage test.

Alejandra Nieto et al., PDA J Pharm Sci Technol, Mar. 15, 2018, doi:10.5731/pdajpst.2017.008391, discloses finite Element (FE) simulations applied in order to investigate the sealing behaviour of rubber stoppers for the drug product CCS (Container Closure Systems) under frozen storage conditions.

In the meaning of the invention pharmaceutical containers are composed of two parts, that is of two devices, the container itself, which shows an opening, and a closure system that is used to close this opening of the container, such as a lid. The container closure integrity testing is used to test the working of this closure system to close the container.

Container closure integrity testing is, in particular for glass vial/rubber type closure systems, an essential part of pharmaceutical production. Sterility of the enclosed compositions is a major concern. As such it is important to determine whether or not the closure system provides an effective barrier against microorganisms.

One effective test method is the microbial challenge test. This test is effective, but very labor intensive and requires large numbers of samples and involves a long lag time before the results can be evaluated.

An alternative method for testing the integrity of closure systems is leak testing. In these test systems, the containers with the closure systems are tested using a testing gas, which is detectable, usually helium. In a simple system, it is tested whether or not the testing gas is escaping the closure system.

FIGS. 1A and 1B illustrate the common principle of He-leak testing devices. Briefly, the container (6) to be tested is inserted into a test chamber (1) comprising an outlet (2) and sealing means (3), usually an O-ring. The sealing means allow the separation of the chamber (1), in which the closure system can be located, from the outer atmosphere. The chamber (1), comprising the outlet and closure system, when a container is inserted, will be referred to as upper part of the device, above the sealing means or upstream portion, while the part of the device on the other side of the sealing means will be referred to as lower part of the device, below the sealing means or downstream portion.

In some methods, the container contains helium or another detectable gas. In other methods, the container is for the purpose of testing provided with an opening (6.4) below the sealing means which allows helium or another detectable gas at a defined pressure to enter into the container in order to contact the closure system (12) from the inside of the container (6) with helium. The outlet is typically connected to a He-detector, usually a mass spectroscopic detector.

The chamber (1) is then evacuated and a pressure difference between the container inside and the chamber is generated. The pressure at which He or the other detectable gas starts leaking and thereby is detected is determined. The container is considered sealed if the gas is only detected at a pressure below a predefined threshold value.

The inventors found that the present method comprises a yet unnoticed drawback. Since the method involves evacuation, it is possible that the pressure difference thus generated pushes or sucks the container against the chamber wall (see FIG. 1B). In other words, the container may get sucked into the chamber by the vacuum. This can also already happen by wrongly placing the container in the inside of the chamber and bringing the closure system in contact with the chamber wall. The inventors found that several factors exist which could influence the result of the leak test, in particular if the closure system would come in contact with the device wall.

This would add a new source of pressure on the closure system which can result in false positives and negatives.

A commonly used closure system is depicted in FIGS. 2A and 2B. A common pharmaceutical closure system may comprise a rubber stopper (18) which resides on a container such as a vial and is held in place by a crimp cap (19). In addition (FIG. 2B), the closure system might comprise a further protective or decorative lid (20). The rubber stopper is effectively compressed onto the vial (see FIG. 3A) and applies or exerts a force (21, 22) on the vial to seal it. The force is defined as the residual seal force (RSF) and depends on the surface of the rubber stopper and on the surface of the inside of the opening of the vial. Depending on the size, the residual seal force is typically between 25 and 75 N.

Effectively, the compressed rubber stopper (18) behaves like a compressed spring. The residual seal force can be determined with an indirect measurement of the compression force exerted by the rubber stopper.

The measuring principle is based on opposing forces, depicted in FIGS. 3A and 3B. The first force vector, the compression force (22) of the compressed rubber stopper, points upwards (FIG. 3A, 3B). The second force vector (21), the force applied when testing the RSF, points downwards (FIG. 3A, 3B). The RSF may be tested with an ordinary stressstrain instrument, which applies a constant rate of compression force to the top of a capped vial. The RSF of a capped vial is the point where both force vectors (21, 22) have equal values (FIG. 3B). Once the force applied by the instrument exceeds the compression force of the rubber stopper, the skirt of the crimp cap begins to move downwards, away from the vial flange (black circles (23), FIG. 3C). The instrument records a function of compression force applied to the capped vial vs. distance and calculates the RSF from this function.

To summarize, an RSF test allows calculation of the seal force of a capped vial independently of the capping equipment which was used to cap the vial. Different closure systems and different combinations of containers with closure systems are likely to have different acceptable RSF ranges and demand different capping equipment settings.

A sample calculation of the residual seal force for a vial with a closure system according to FIG. 2A results in the following determined residual seal force:

Vial pressure (22) on rubber stopper (18):
a) $P_{AIR}$=1 atm=101 kPa=101 kN/m$^2$=10.1 N/cm$^2$=10 N/cm$^2$
b) For a 50 ml vial with inner radius of the neck of the vial of 0.88 cm and a respective area A2 of this neck of the vials, the RSF $N_{SEAL}$ is calculated as follows:

$$N_{SEAL}=A2*P_{AIR}=(0.88 \text{ cm})^2*3.14*P_{AIR}=2.43 \text{ cm}^2*10 \text{ N/cm}^2=24.3 \text{ N}$$

If the rubber stopper rests against the chamber wall (FIG. 3D) of a container closure integrity testing device, the pressure on the rubber stopper and with that the residual seal force increases drastically:

Vial pressure on stopper
a) $P_{AIR}$=1 atm=101 kPa=101 kN/m$^2$=10.1 N/cm$^2$=10 N/cm$^2$
b) For the 50 ml vial with an inner radius of 2.125 cm:

$$N_{SEAL}=A1-A2*P_{air}=((2.125 \text{ cm})^2*3.14-(0.88 \text{ cm})^2*3.14)*P_{air}=(14.18 \text{ cm}^2-2.43 \text{ cm}^2)*10 \text{ N/cm}^2=117.5 \text{ N}.$$

As such there is a need for a device and method, which removes the disadvantages of the state of the art.

SUMMARY OF THE INVENTION

It was found, that a device which avoids the contact of the closure system with the wall of the device overcomes the problems of the state of the art. As such the invention relates to a device, which prevents contact of the closure system with the wall of the device.

In addition to the device, the invention further relates to a method for testing the integrity of a closure system of a container by using said device, and to the use of said device or said method to test the closure integrity of closure systems of pharmaceutical containers for sterile compositions.

DETAILED DESCRIPTION OF THE INVENTION

Figure 1A:
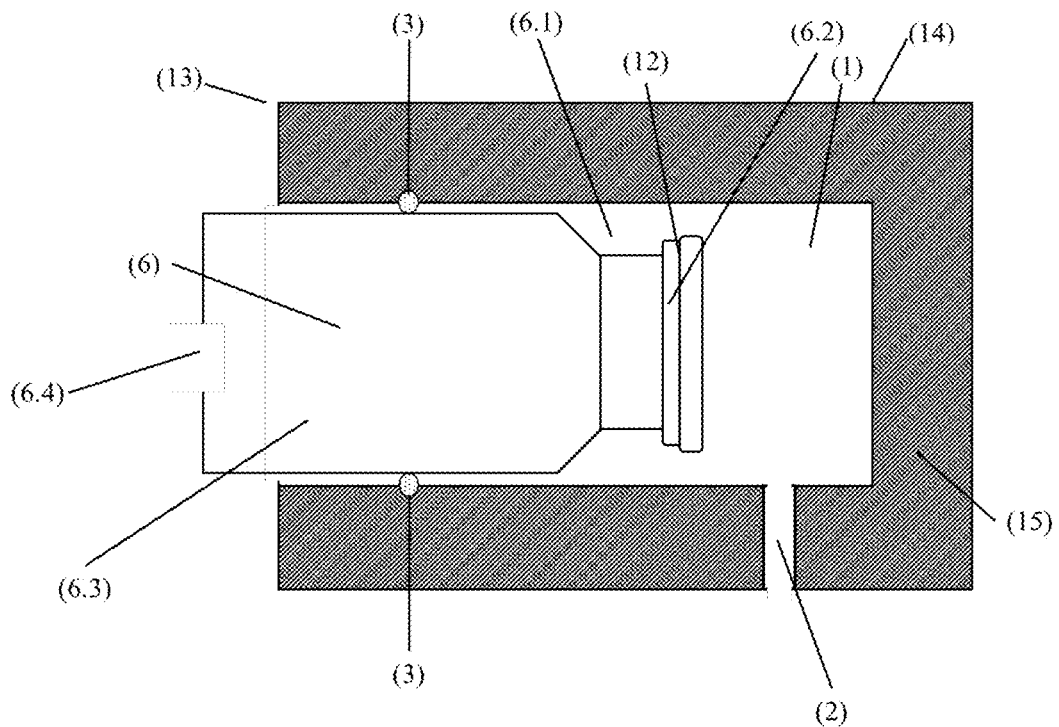
FIG. 1A: Schematic drawings of a container closure integrity testing device according to the state of the art.

The present invention is based on the finding that common He-based leak testing for closure integrity may produce false results, due to the positioning of the container or the pressure exerted on it during testing.

The invention is particularly suitable for non-pressurized containers.

The invention relates to a device (13) for testing the integrity of a closure system (12) of a container (6), said container having a top portion (6.1) comprising a main opening (6.2) and a bottom portion (6.3), wherein the main opening (6.2) is closed by the closure system (12), said device (13) comprising
(a) a casing (14) having a wall (15) forming a chamber (1) into which at least the top portion (6.1) of the container (6) is insertable;
(b) sealing means (3) adapted to seal at least a portion of the chamber (1) against the container (6) if the container or the top portion (6.1) thereof is inserted;
    the sealing means divide the device and the chamber (1) into an upstream portion, which is above the sealing means and where the top portion (6.1) is located, and into a downstream potion, which is below the sealing means and where the bottom portion (6.3) is located;
(c) an outlet (2) in the wall (15) of the casing (14) of the upstream portion of the chamber (1) for allowing the efflux of a gas from the upstream portion of the chamber (1); characterized in that the device (13) comprises positioning means (4, 5) for preventing contact between the closure system (12) and the wall (15) of the device (13) when the top portion (6.1) of the container (6) is inserted into the chamber (1) of the device (13).

In a preferred embodiment of the invention, said container is a non-pressurized container.

The upstream portion of the chamber (1) is the part of the chamber upstream of the sealing means and is the sealable part of the chamber (1).

By positioning the outlet (2) in the upstream portion of the chamber (1) the outlet is positioned in the sealable part of the chamber.

The container can comprise an opening (6.4) in addition to the main opening (6.2); preferably the opening (6.4) is located in the bottom portion (6.3).

In some embodiments of the invention the sealing means (3) or a portion of the wall (15) is adapted to function as the positioning means (4, 5).

In a preferred embodiment of the invention, said positioning means and sealing means are two separate means.

In a preferred embodiment, the positioning means is an integral part of the device.

In some embodiments, the positioning means is a part which is removable from the device and can be placed on the container.

The positioning means ensure that the container, and in particular its closure system, does not get into contact with the wall of the device during the container closure integrity test. Suitable positioning means will be apparent to the person skilled in the art.

Non-limiting examples of devices and positioning means can be found in the schematic drawings of FIGS. 4A to 4I.

Figure 4A:
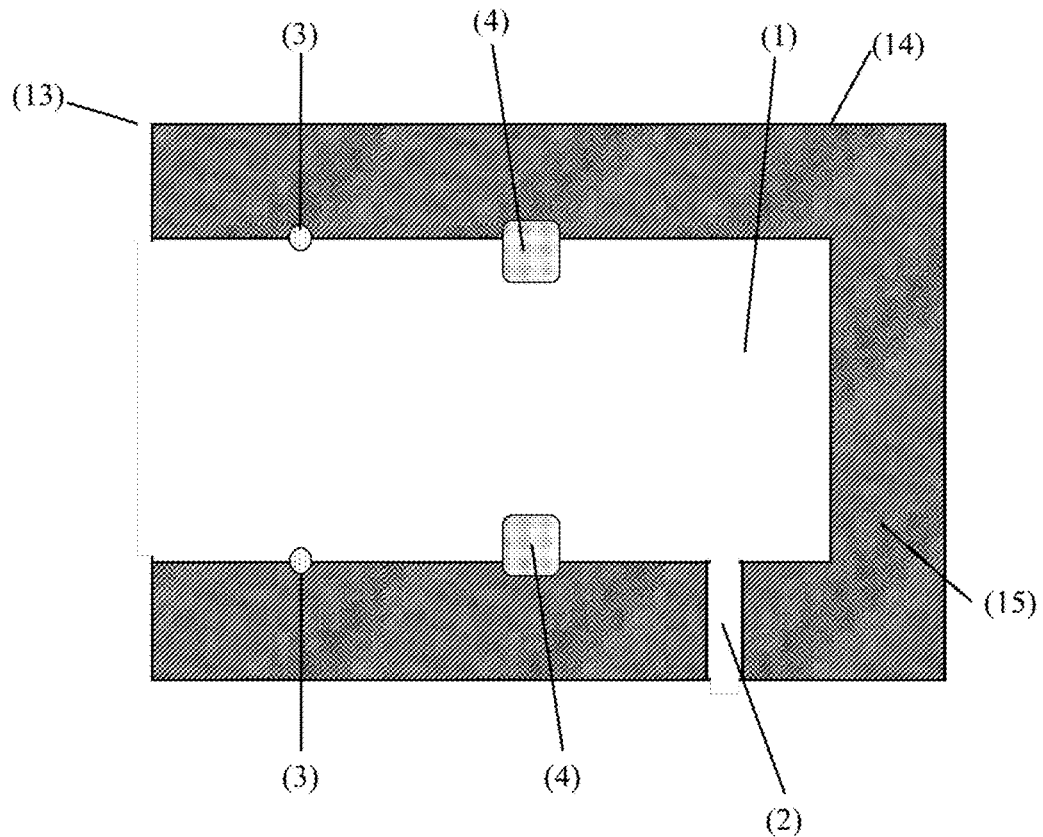
FIGS. 4A-4I: Different schematics of devices according to different embodiments of the present invention.
Figure 4B:
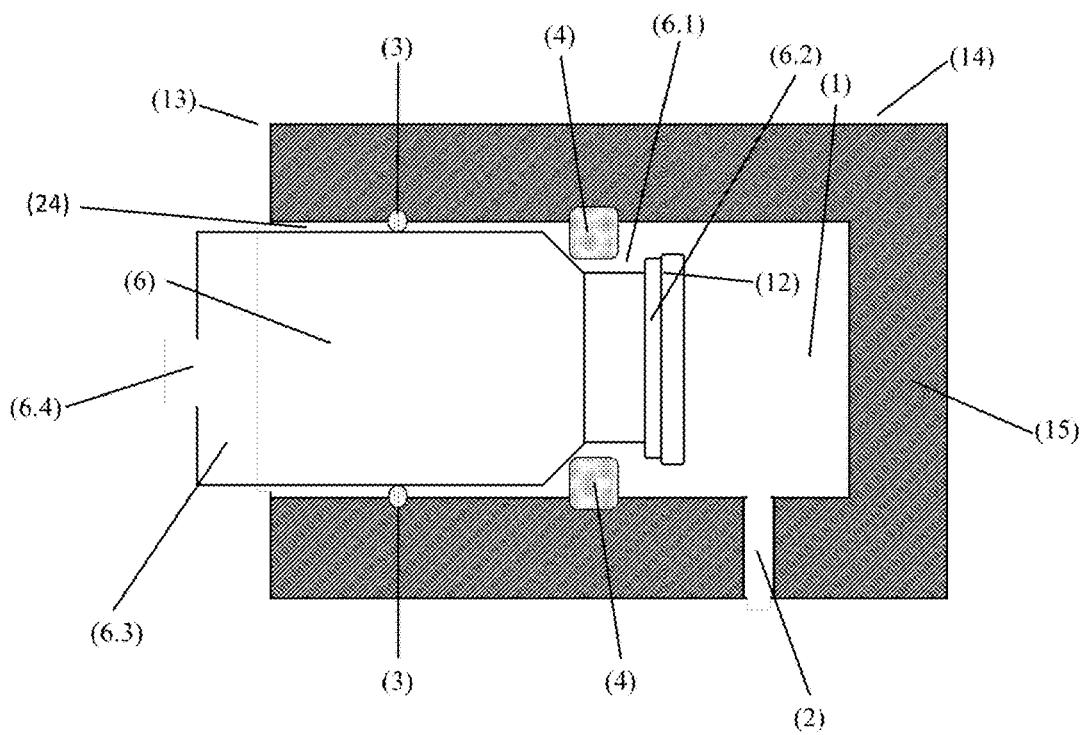

FIGS. 4A and 4B show a device, wherein the positioning means (4) are placed above the sealing means (3). In this case, the positioning means prevent the container to move beyond the positioning means. The positioning means might be a stopping ring, which circumferentially encloses the neck of the container or sits on the shoulder of the container and encloses the closure system (FIG. 4N).

Figure 4C:
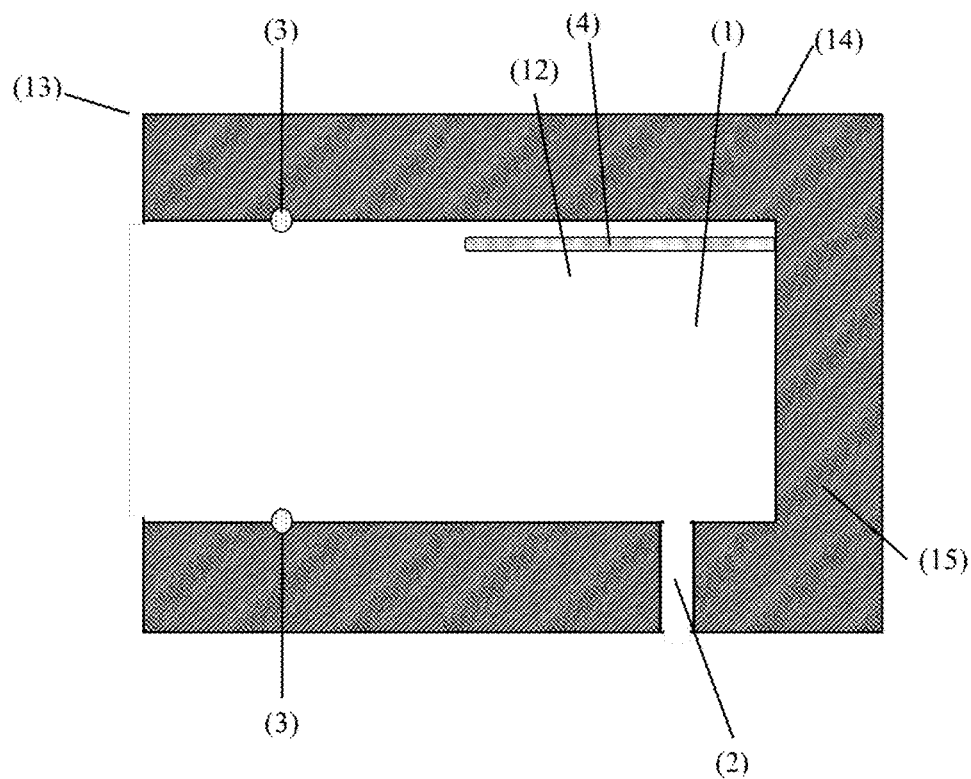
Figure 4D:
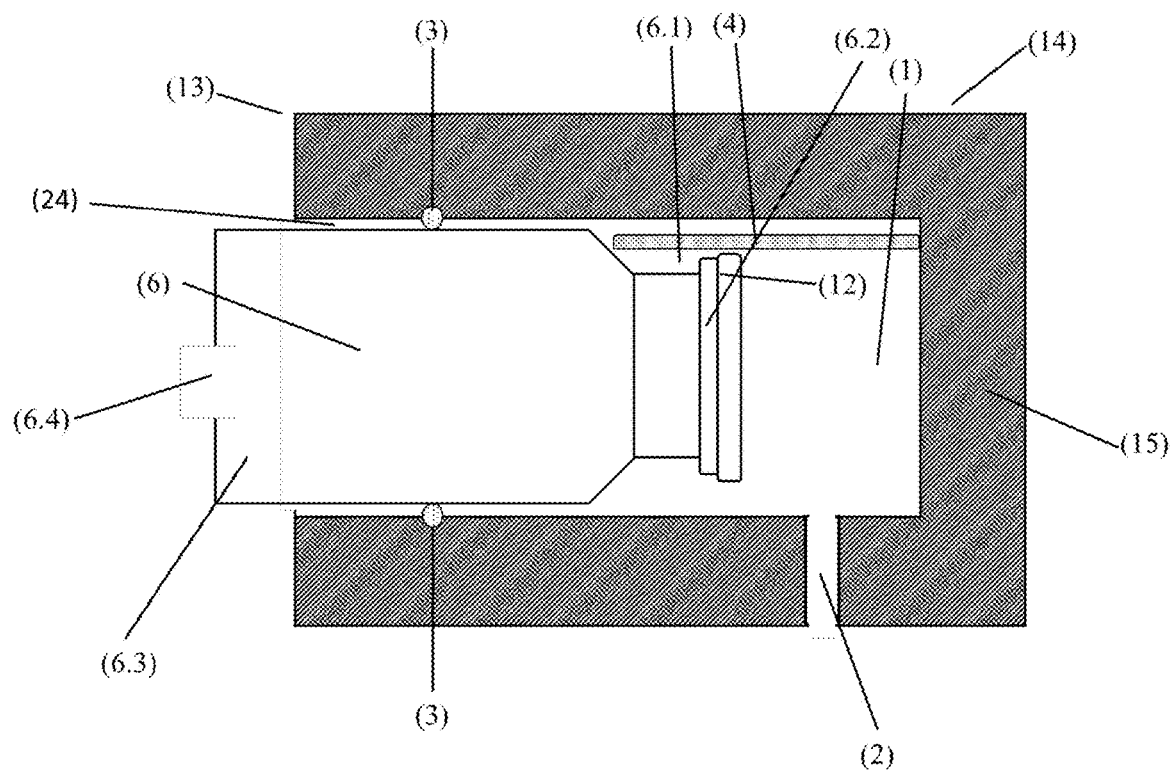

FIGS. 4C and 4D show a similar embodiment. In this embodiment, the positioning means (4) is a stopper, which prevents the container from being further inserted, or moving past the stopper.

Figure 4E:
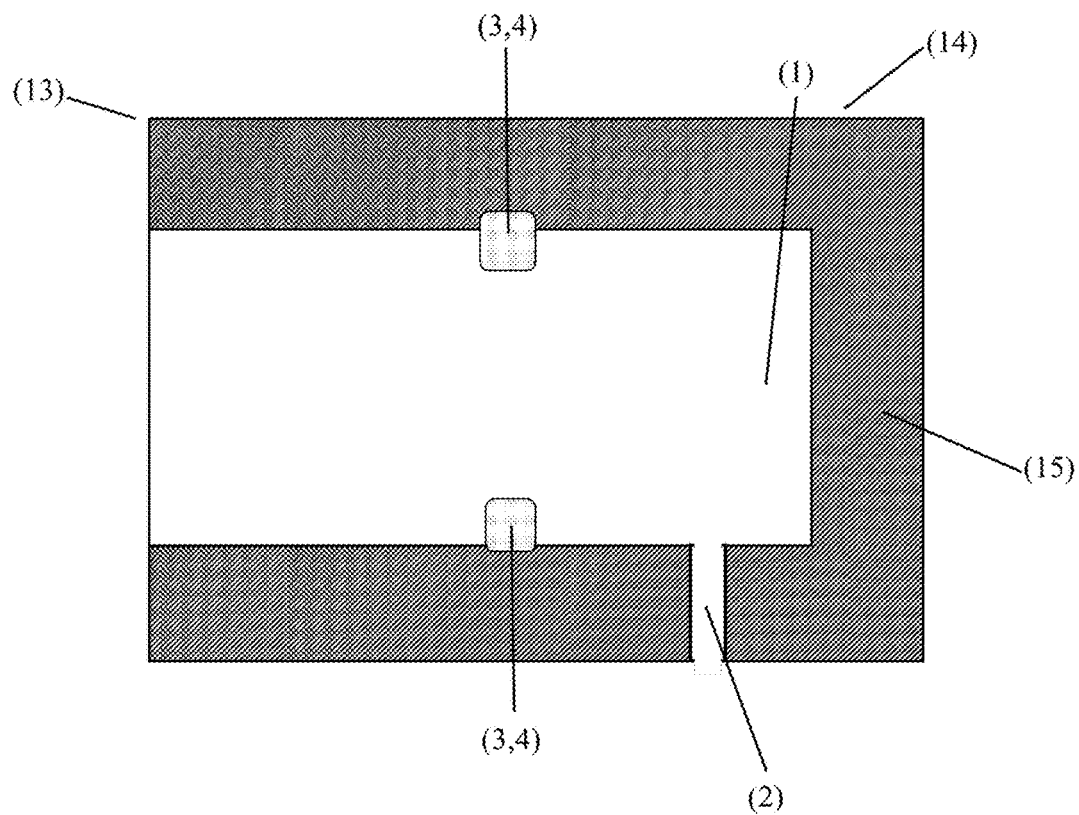
Figure 4F:
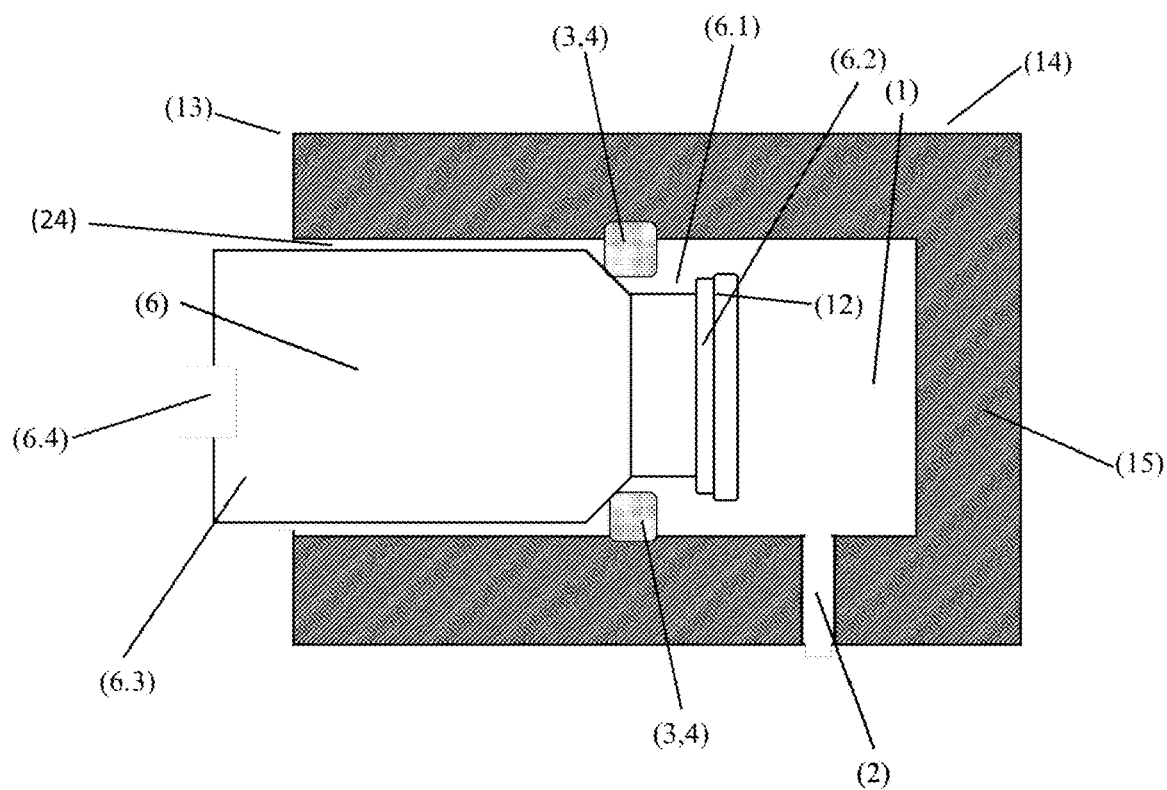

FIGS. 4E and 4F show a device, wherein the sealing means (3) have been adapted to act simultaneously as positioning means (4).

Figure 4G:
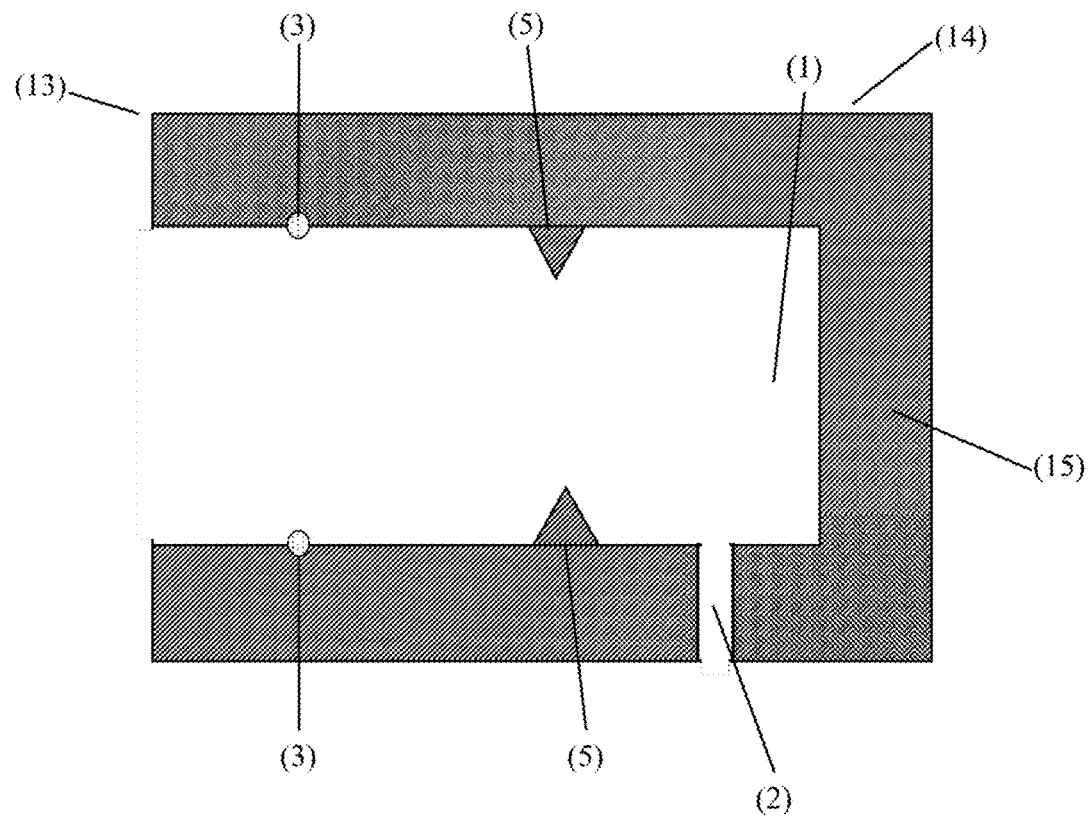
Figure 4H:
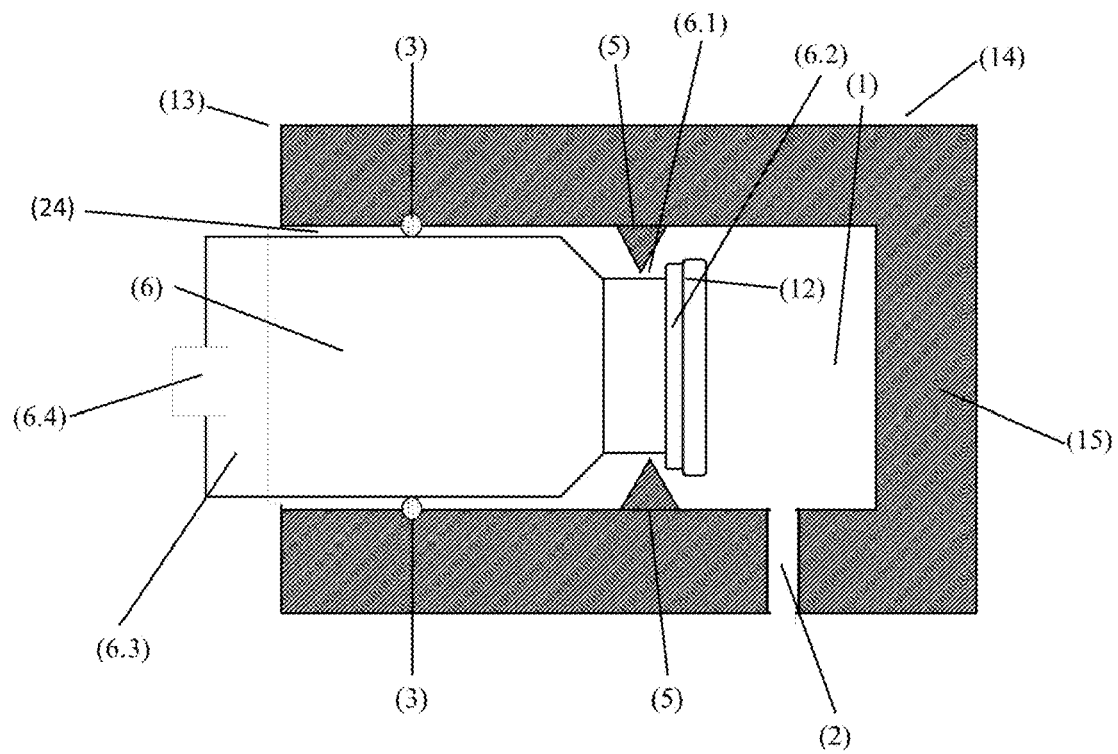

FIGS. 4G and 4H show a device, which comprises integrated measures to act as positioning means (5). In this case, the positioning means could be a rim on the inside of the wall (15).

Figure 4I:
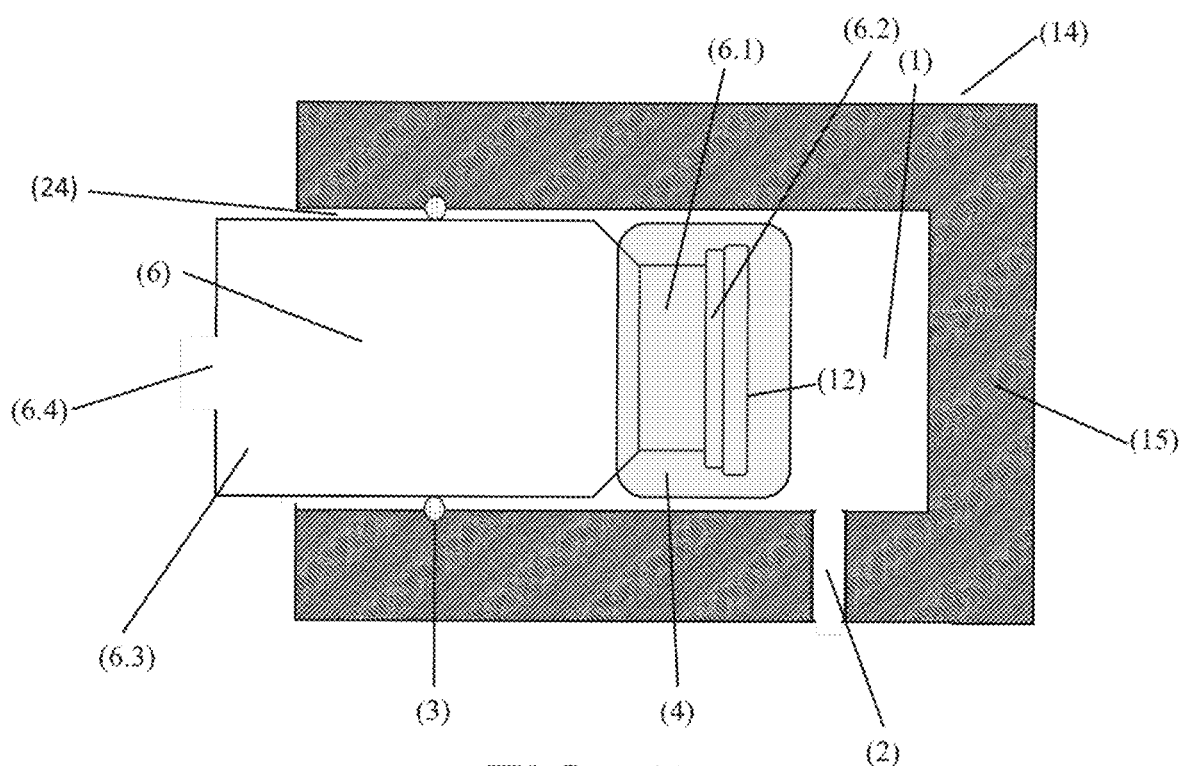
Figure 4J:
FIGS. 4J-4M: Photographs of a specific embodiment.
Figure 4K:
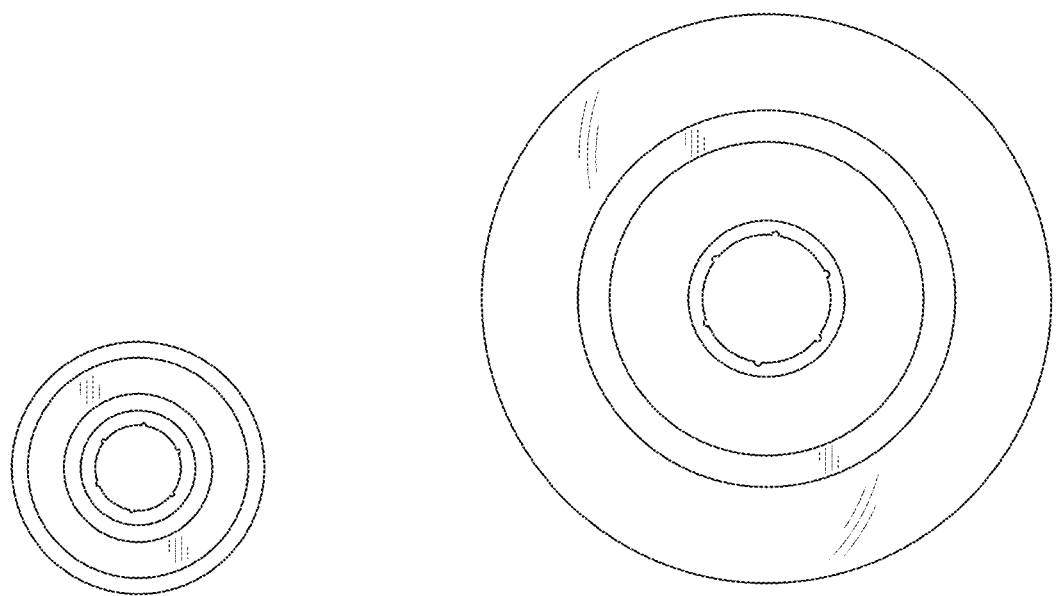
Figure 4L:
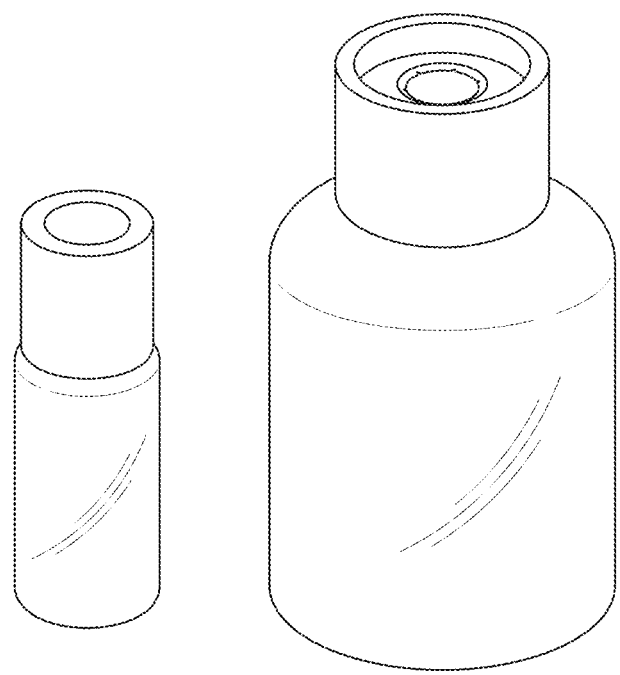
Figure 4M:
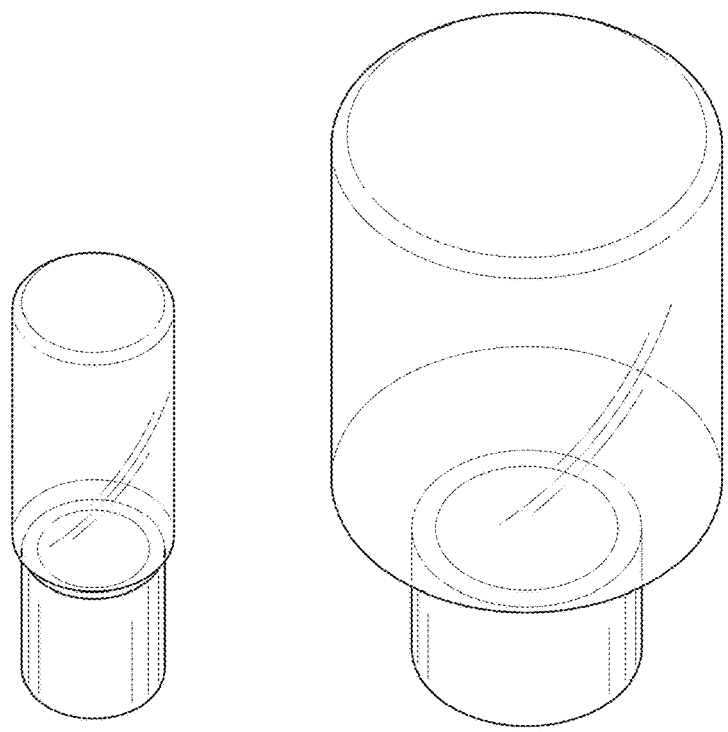
Figure 4N:
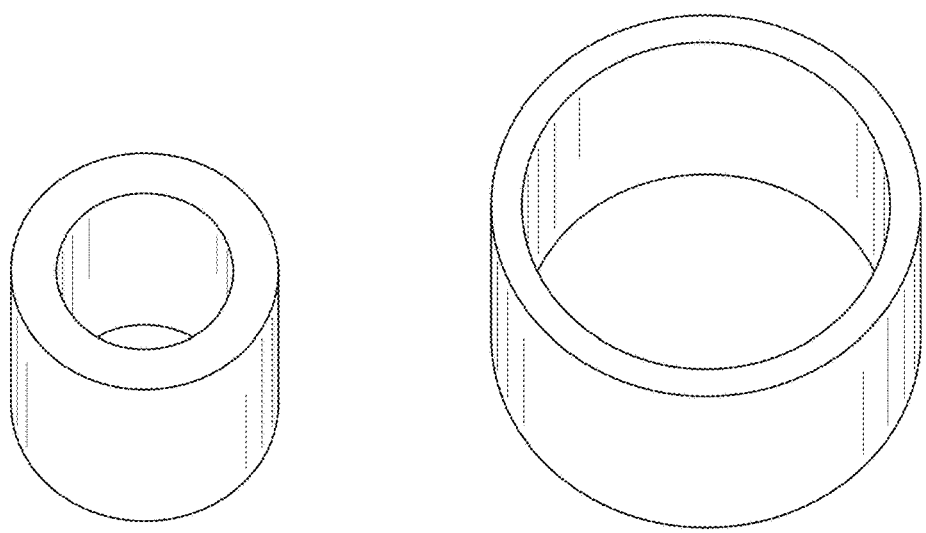
FIG. 4N: Photograph of an embodiment of a positioning means.

FIG. 4I shows a device, wherein the positioning means (4) is separate of the casing (14), for example in form of a ring, which can be placed over the container (6). FIGS. 4J-4M show a photograph of a specific embodiment of containers.

FIG. 4N shows a photograph of an embodiment of a positioning means in form of a ring.

Except for the positioning means, the device according to the present invention might be based on a testing device known in the prior art. In one embodiment, said device is an adaptor to be placed on the container which is to be tested, and which is compatible with a common leak detection system. In particular, the device might be a flange or a ring. Alternatively, the device according to the invention might be part of a device suitable for testing the closure integrity.

Devices for leak detection in container closure integrity testing are known to the person skilled in the art. In general, these devices are based on mass spectrometric He detection.

Aside from the positioning means, a second important feature of the present invention is the sealing means, which might be adapted to also perform as positioning means. In one embodiment of the invention, the sealing means comprises at least one O-ring.

Therefore, in one embodiment the invention relates to a device, wherein the sealing means comprises at least one O-ring.

It is preferred that the sealing means, which can also function as the positioning means, is made from a flexible material. Preferably, said flexible material is able to hold the container and to seal the chamber, allowing the evacuation of the chamber. In a preferred embodiment, said sealing means is made of a material selected from an elastomer, such as rubber, latex, or silicone. However, any material allowing sealing of the chamber is suitable.

Accordingly, in one embodiment the invention relates to a device, wherein the sealing means is made from an elastic material.

The elastic material can be based on rubber, latex, or silicone.

As mentioned, the sealing means might be adapted and/or positioned to also serve as positioning means. An example of sealing means adapted to serve as positioning means can be seen in FIGS. 4E and 4F. In one non-limiting embodiment, said combined positioning and sealing means comprises an O-ring, which allows the top portion of the container with the closure system to pass through, but does not allow the whole container to pass.

This might be realized with an O-ring which has a diameter that is larger than the diameter of the closure system but smaller than the largest diameter of the container. The person skilled in the art will readily notice further suitable embodiments.

In alternative embodiments of the invention, the positioning means is independent of the sealing means. The positioning means might be an additional O-ring, or simply a stopper in the device preventing the closure system from contact with the wall of the device.

Accordingly, in one embodiment of the invention, the positioning means comprises an O-ring.

Therefore, in a preferred embodiment the invention relates to a device, wherein said sealing means comprises an O-ring adapted to function as said positioning means.

In one embodiment of the invention, the positioning means comprises at least one stopper. A stopper within the meaning of the present invention might be a simple protrusion, e.g. extending from the wall of the device (see FIG. 4C or 4D), preventing the container from moving beyond a defined position.

Said stopper can be positioned on the wall of the device preventing the container from passing or can extend from the wall of the device, preferably from the top portion of the wall of the device, to provide a stopping point. Preferably, the positioning means allow to center the closure system of the container within the device.

In a preferred embodiment, the positioning means is adapted to keep the container in a defined position in which the closure system is not in contact with the wall of the device. The positioning means can also be adapted to ensure the correct orientation of the container. Preferably, the positioning means prevent the movement of the container in of into the chamber.

In a preferred embodiment, the positioning means is a stopper, wherein the stopper is integral to the wall of the device.

In specific embodiments, the wall of the device is shaped such as to function as positioning means, holding the inserted container such that the closure system is not in contact with the wall of the device.

In other words, the positioning means should prevent the closure system from contact with the device. It is therefore important that the positioning means is suitable to keep the container positioned. In the devices of prior art which do not have a positioning means it is possible that the container moves, for example due to the pressure difference between the downstream and upstream portion of the device or the chamber. Accordingly, the positioning means should prevent a repositioning of the container even when a pressure difference is applied.

The positioning means may be of the same or a different material than the sealing means.

In one embodiment of the invention, the positioning means is made of the same material as the sealing means.

In another preferred embodiment, said material is a flexible material, such as an elastomer, for example selected from rubber, latex, or silicone.

In a further embodiment, the positioning means is made from a rigid material, such as plastic, metal, or a rigid composite material.

If in contrast the positioning means is an integral part of the device, e.g. the wall is shaped to serve as positioning means, it is preferred that the positioning means is positioned and arranged in a way not to damage the container.

The positioning means may be made of the same or different material as the wall of the device. If the positioning means is integral to the device, it is preferred that it is made of the same material as the device.

The device and in particular the casing might be made of any suitable material. Particularly suitable materials include, but are not limited to metals, metal alloys or plastic In one embodiment of the invention, the casing is made of plastic, metal, or metal alloys.

In a preferred embodiment, at least part of the casing is made from steel, aluminum or plastic.

More preferably, the casing is largely made from steel, aluminum or plastic.

The device may be adapted and/or sized for one specific type of container defined by its dimensions. Alternatively, the positioning means and/or sealing means may be exchangeable to allow adaptation of the device to different sizes or shapes of containers. If the device is adaptable to different sizes of containers or to different container shapes, it is preferred that the exchangeable sealing means and/or positioning means are made of the same material. Preferably, in this case the sealing means is adapted to function as positioning means.

One embodiment of the invention is a device which is adapted to test the closure system integrity of a container, wherein the diameter of the closure system is smaller than the largest diameter of the container. In one embodiment, the positioning means allow, during the insertion of the container closed with the closure system, the passage of the closure system but do not allow the passage of the container, rather stopping the insertion of the container before the closure system comes into contact with the wall (15) of the chamber (1).

The device comprises a casing with a wall, forming a chamber. The sealing means is positioned in such a way that at least a portion of said chamber is sealed against a container, if a container is inserted. As stated above, the casing is preferably made from plastic, metal or a metal alloy. More preferably, said casing is made from steel, aluminum or plastic.

It is essential that the casing is able to withstand a pressure difference between the sealed inside of the chamber and the external environment when the testing conditions are applied.

In one embodiment, the device is adapted to be placed over the top of the container enclosing the closure system to be tested, so that the bottom of the container is outside the device. In another embodiment, the device is adapted to completely encase the container comprising the closure system to be tested. In a further embodiment, an apparatus is provided which comprises a plurality of the devices of the invention.

The device comprises at least one outlet in the sealable chamber, or in the sealable part of the chamber which may be evacuated. Said outlet may comprise a means to connect the outlet to a further device, such as a device with a detector for a testing gas.

Accordingly, in a preferred embodiment of the invention, the device is connected to a detector.

Preferably, the detector is a mass spectrometer.

Said detector for a testing gas might detect any suitable testing gas. Preferably, said testing gas is helium. More preferably, the testing gas is helium and the detector is a mass spectrometric helium detector.

The outlet might serve further or alternative purposes. Preferably, the chamber can be evacuated. The evacuation might be performed over the same outlet which is also connected to a device for detecting the testing gas, or over a further outlet. Preferably, the chamber is evacuated using the same outlet.

The device may comprise two casings, a first casing into which the container (6) or the top portion (6.1) of the container is inserted, and a second casing (8), which can be connected to the first the casing.

Figure 5:
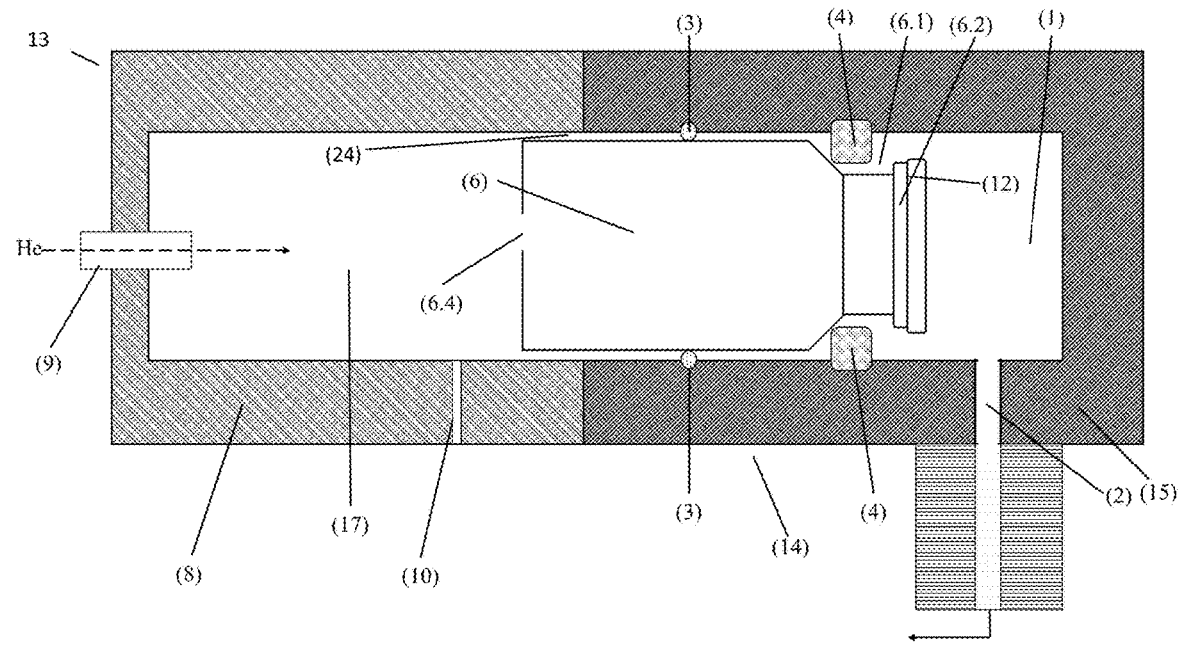
FIG. 5: Device according to the present invention, additionally comprising a second casing, suitable for use in a method according to the present invention.

FIG. 5 shows an embodiment of the device with two casings.

Said second casing preferably comprises an inlet for a testing gas. The second casing can comprise an outlet, which can be used to control the pressure of the testing gas.

The testing gas should not interact with the sealing means or the closure system. Preferably, the testing gas is helium or another detectable inert gas. Preferably, the testing gas should not be able to diffuse through the sealing means or through the closure system.

The second casing is preferably separable from the first casing. The second casing may comprise additional positioning or sealing means. In a preferred embodiment, the second casing comprises means for holding an inserted container in place.

All sealing and positioning means should be adapted for the container, in particular for the material of the container. Preferably, the container is made from a stable material, able to withstand pressure differences. Preferably, the container is made from glass, plastic or metal. For the avoidance of doubt, the container and the closure system are not part of the device of the invention.

In a particular embodiment of the invention, the device according to the invention comprises or is connectable to means for temperature control, in particular cooling means and/or heating means In a preferred embodiment, the device comprises means to be connected to a computing device.

In a specific embodiment, the device according to the invention additionally comprises cooling means and/or is connectable to cooling means.

In a particular embodiment, the device is connectable to cooling means and the device and the cooling means are connectable to computing means. In a different preferred embodiment, the device additionally comprises cooling means and means to connect to a computing device.

In a preferred embodiment of the invention, the cooling means allow at least the cooling of the closure system (12) of the container (6), more preferably, the cooling means allows cooling of at least the container comprising the closure system, even more preferably, the cooling means allow cooling of the chamber (1) or particularly preferable, the device.

In a preferred embodiment, the cooling means allow sequential, preferably continuous cooling of the device, chamber (1) container (6) and/or closure system (12).

In a preferred embodiment the cooling means allow cooling to temperatures of at least −20° C. or lower, preferably at least −50° C. or lower, more preferably at least −80° C. or lower, particularly preferably −100° C. or lower, more particularly −196° C. (77 K) or lower.

The invention further relates to a computing system, configured to control the device and means for temperature control according to the invention.

The closure system to be tested may be any suitable closure system. Non-limiting examples of closure systems comprise an elastomeric part which in responsible for the actual closing or sealing of the opening of the container which needs to be closed. Examples the material of the elastomeric part are rubber or silicone. The form of the elastomeric part can be a plug or a lid. The closure system can also comprise means for fixing the elastomeric part to the opening of the container, an example for such means for fixing the elastomeric part to the opening of the container is a metallic crimp. Preferably closure systems comprise a combination of a rubber sealing system and a metallic crimp. However, any closure system may be tested with a respectively adapted device according to the invention.

Certain non-limiting embodiments of the invention are now explained with reference to the figures.

Figure 1B:
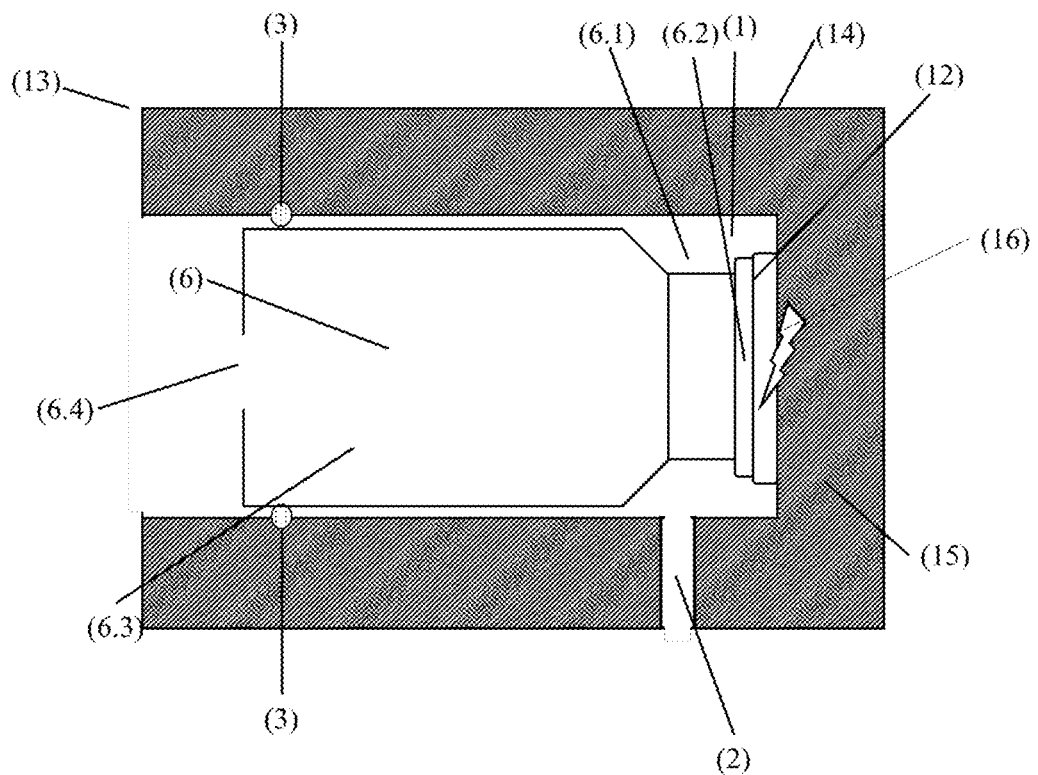
FIG. 1B: Schematic drawing, showing specific disadvantages of the state of the art.
Figure 2A:
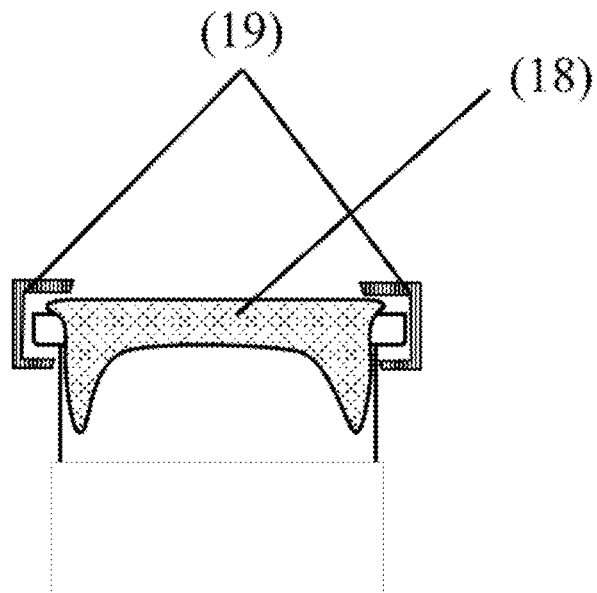
FIG. 2A, 2B: Schematic drawing of common closure systems.
Figure 2B:
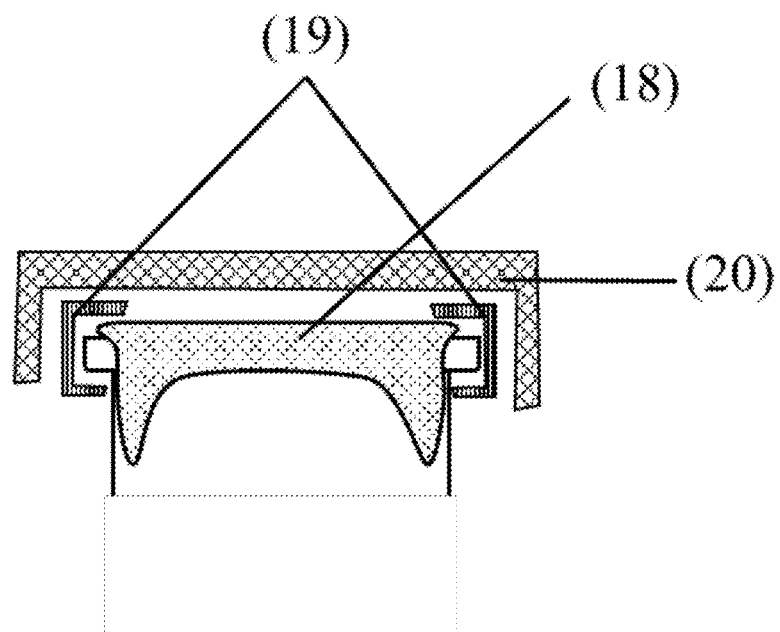
Figure 3A:
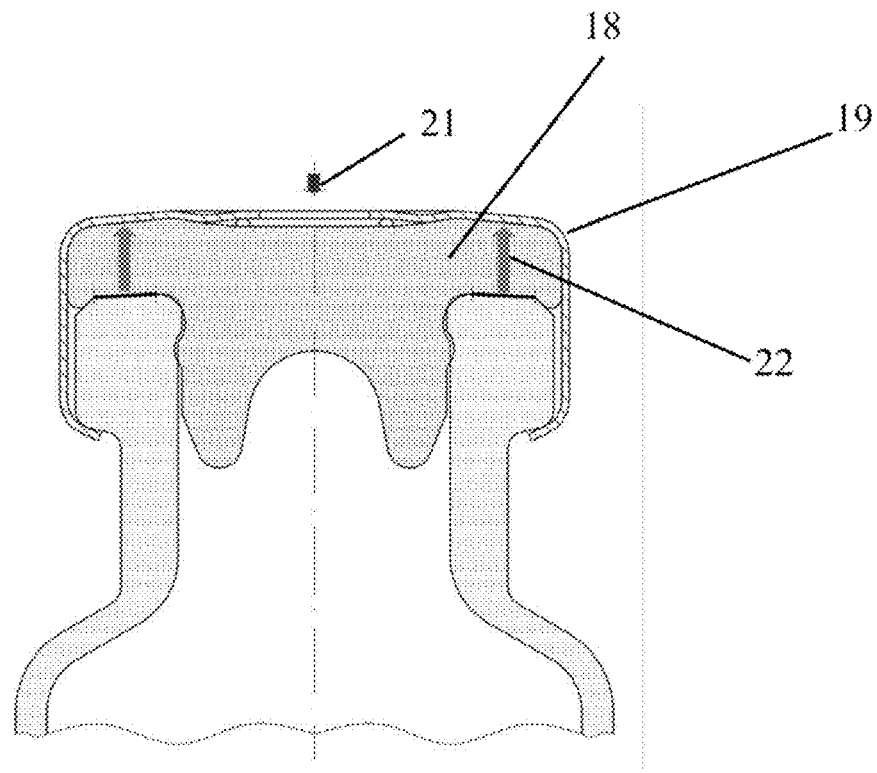
FIG. 3A, 3B, 3C: Illustration of determination of residual seal force.
Figure 3B:
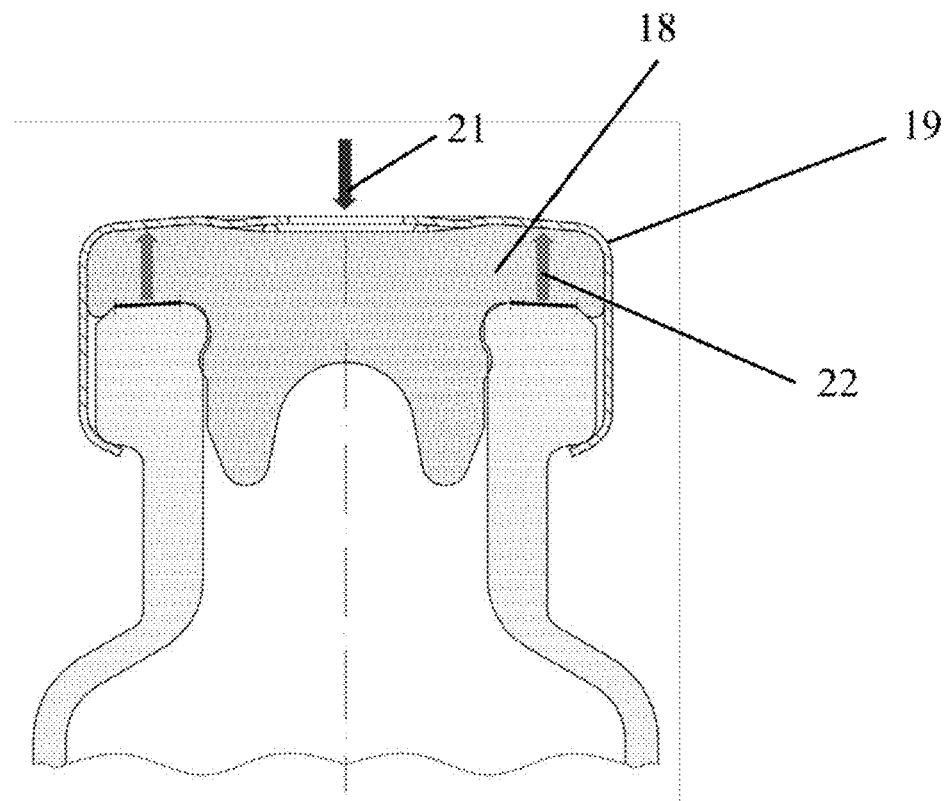
Figure 3C:
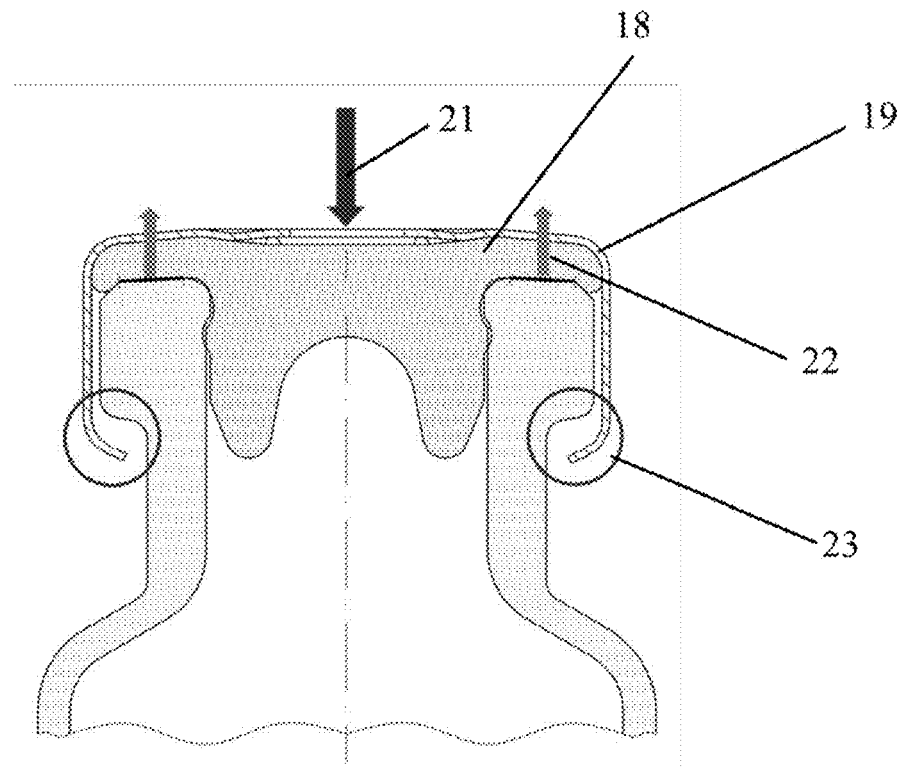
Figure 3D:
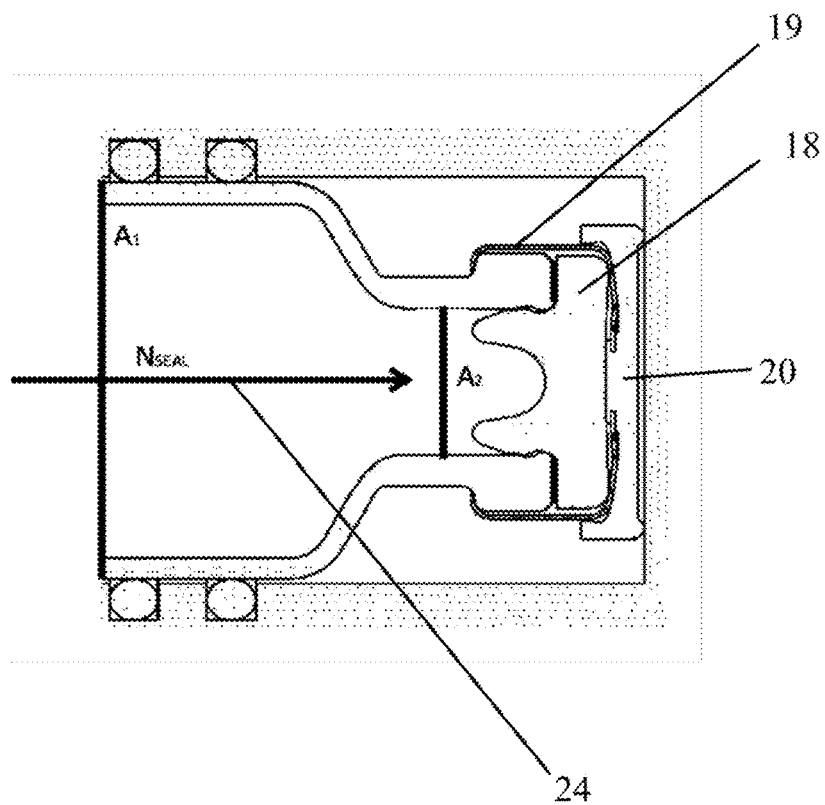
FIG. 3D: Illustration of residual seal force changes when the closure system of the container is in contact with the wall of a container closure integrity test device.

FIG. 1A show a schematic cross-section of a container closure integrity testing device (13) according to prior art. For clarity, the device is shown with an inserted container (6) comprising a top portion (6.1) with a main opening (6.2) and a bottom portion (6.3). The container is closed by the closure system (12). The device itself is made of a solid casing (14) comprising a wall (15), an outlet (2) and sealing means, which allow the formation of a chamber (1), if a container (6) is inserted. The sealing means (3) are positioned and fitted to be in contact with the container (6), allowing the chamber (1) to be separated from the rest of the device. FIG. 1B shows the major disadvantage of the device according to prior art, wherein the container (6) could be positioned to far into the chamber (1), either by accident or possibly due to pressure difference, thus getting into contact with the wall (15), which may result in additional pressure (16) resting on the closure system (12).

FIGS. 4A to 4I show a schematic cross-section of various embodiments of devices (13) according to the invention. For better visualisation, the devices (13) are shown with and without a container (6) comprising a closure system (12). Like the devices according to prior art the devices according to the invention comprise a solid casing (14) comprising a wall (15), an outlet (2) and sealing means, which allow the formation of a chamber (1), if a container (6) is inserted. The sealing means (3) are positioned and fitted to be in contact with the container (6), allowing the chamber (1) to be separated from the rest of the device. In addition to the sealing means (3) the device comprises positioning means (4, 5) to prevent contact of the container (6) with the wall (15) or other parts of the casing (14).

The positioning means (4) may be in the form of a further O-ring (FIG. 4A, 4B), or are designed as a stopper (FIG. 4C, 4D) or an integral part (FIG. 4G, 4H) of the wall (5, 15). In specific embodiments, the positioning means (4) and the sealing means (3) are combined into a larger O-ring (FIG. 4E, 4F). In some embodiments, the positioning means is an independent part to be connected to the container (FIG. 4I).

FIG. 5, shows a cross-section of a device (13) according to the invention, comprising a first casing (14) comprising a wall (15), an outlet (2) and sealing means (3), which allow the sealing of the chamber (1), if a container (6) is inserted. The sealing means (3) are positioned and fitted to be in contact with the container (6), allowing the chamber (1) to be sealed from the downstream portion of the device. In addition to the sealing means (3) the device comprises positioning means (4) to prevent contact of the closure system (12) with the wall (15) or other parts of the casing (14). The outlet (2) is connected to a detector. The first casing (14) is connected to a second casing (8), forming a second chamber (17) comprising an inlet (9) for a testing gas and an outlet (10) for pressure control in the second chamber (17). In the figure, the container (6) is shown inserted, the container comprising the closure system (12) and an additional opening (6.4) to allow a testing gas to enter the container.

The second casing might be used as a reservoir for a testing gas, wherein the inside of the second chamber and container is filled with an atmosphere of testing gas. In a preferred embodiment of the invention said atmosphere comprises at least 50%, even more preferably, at least 75%, especially at least 80%, more especially at least 85%, even more especially at least 90%, in particular at least 95%, of testing gas, the % being % by volume based on the total volume of the atmosphere.

Further subject of the invention is a method for testing the integrity of a closure system (12) closing a container (6) comprising the steps of:

(a) placing the closure system (12) of a container (6) into a chamber (1) of a container closure integrity test device (13) and sealing wall (15) of the chamber (1) against of the container (6), wherein the container (6) is closed with the closure system (12), and wherein the container is or can be filled for the test with a testing gas, and wherein the closure system (12) is prevented from contact with the wall (15) of the chamber (1);

(b) generating a pressure difference between the inside of the container (6) and the inside of sealed chamber (1);

(c) detecting the testing gas that passes the closure system (12).

Preferably, the container (6) closed with the closure system (12), wherein the container is or can be filled for the test with a testing gas, is provided.

The pressure difference between the inside of the container and the inside of the chamber (1) can for example be generated by evacuating the inside of the chamber (1), by applying pressure at the inside of the container, or by both measures, preferably by evacuating the inside of the chamber (1).

In a preferred embodiment of the invention, the container is a non-pressurized container.

Preferably, said the container closure integrity test device is a device as described above.

In one embodiment of the invention the closure system is prevented from contact with the wall of the test device by positioning means (4) (see FIG. 4A to 4I).

In an embodiment of the method the diameter of the closure system is smaller than the largest diameter of the container.

However, any test device adapted to prevent contact of the closure system with the wall of the test device can be suitable.

The method may be a destructive or non-destructive method. In a non-destructive method, the container with the closure system to be tested is filled with the testing gas, before the container is closed with the closure system. In a destructive method, the container with the closure system comprises a further opening, which will be located below the sealing means of the test device.

Preferably, the detection of the testing gas by the detection device is done in form of a concentration, of a flow rate or of an amount, more preferably in form of a flow rate, of the testing gas.

In some embodiments of the invention, the inside of the test device is evacuated and the testing gas detected which is detected from the container. In these cases, the container may be considered sealed if the amount, concentration or flow rate of testing gas is below a predefined threshold value. Preferably. the flow rate of the testing gas is detected. An acceptable threshold value is defined based on the container, the closure system and the intended use.

Preferably, the pressure inside the test device, that is in the sealed chamber (1), is less than 100 mbar, more preferably less than 50 mbar, even more preferably less than 25 mbar, especially less than 20 mbar, more especially less than 10 mbar, even more especially less than 5 mbar, in particular less than 1 mbar.

In a different embodiment of the invention, a pressure difference is generated, preferably by applying a vacuum to the inside of the test device, that is in the sealed chamber (1). Preferably, in such embodiments, the vacuum in the inside of the test device is continuously reduced, while the pressure of the testing gas on the inside of the container is maintained constant.

The test determines the pressure or pressure difference at which a testing gas may be detected. A closure system is considered sufficient, if the pressure at which the testing gas is detected is below a predefined threshold value. Said threshold value is to be defined depending on the requirements of the container and the potential compositions contained inside. In some embodiments, the closure integrity is considered sufficient if the testing gas can be detected below a threshold of $10^{-6}$ mbar.

In a particular preferred embodiment of the invention, the container is inserted in a device as described above, and the container comprises an additional opening (6.4); preferably, the additional opening is located in a further chamber, preferably, in said further chamber a constant pressure of a testing gas is maintained. By the additional opening (6.4), the testing gas can pass into the container during the test. Preferably, the inside of the further chamber is filled with a defined amount or concentration of testing gas, or with a testing gas atmosphere containing the testing gas in a defined concentration.

In a preferred embodiment, the constant pressure is atmospheric pressure.

Preferably, the container is filled with a testing gas atmosphere, comprising at least at least 50%, even more preferably, at least 75%, especially at least 80%, more especially at least 85%, even more especially at least 90%, in particular at least 95%, of testing gas, the % being % by volume based on the total volume of the atmosphere inside of the container and/or chamber.

In a more preferred embodiment of the invention, the testing gas is helium, also with all the possible embodiments of the amounts of He as the testing gas as described herein.

The method according to the invention is suitable to be performed temperature independent.

In one embodiment, the temperature is controlled in the method.

In particular, the method might be performed at constant temperature or at varying temperature. In particular the method is suitable to test the integrity of the closure system at typical storage temperatures.

Preferably, the temperature refers to the temperature of the chamber (1), of the casing (14), of the wall (15) or of the complete device (13), of the container (6), around the closure system (12) or of a combination thereof, is controlled.

It is preferred that the temperature referred to herein refers at least to the temperature of and/or around the closure system.

In a particular embodiment, the casing (14) and the wall (15) are temperature controlled.

In some embodiments the method is performed at room temperature. In a specific embodiment the method is performed at 18 to 27° C., preferably at 20 to 26° C., more preferably at 22 to 25° C., even more preferably at about 24 to 25° C.

The method might be performed at higher or lower temperatures than room temperature. In particular, the method might be performed at lower temperatures than room temperature. In some embodiments, the method is performed at 20° C. or less, in other embodiments at 15° C. or less, in further embodiments at 10° C. or less.

In a specific embodiment of the invention, the method is performed at 0° C. to 10° C., preferably 2° C. to 8° C., more preferably 3° C. to 6° C., particularly preferably at 4° C. to 5° C. In a particular embodiment, the method is performed at 4° C.

In some embodiments of the invention, the method is performed below freezing temperatures. In some embodiments the method is performed at 0° C. or below. In a specific embodiment, the method is performed at −4° C., −5° C., −6° C., −7° C., −8° C., −9° C., −10° C. or below. In some embodiments, the method is performed at −15° C. or below, in particular −20° C. or below.

The method may be performed at even lower temperatures. In some embodiments of the invention, the method is performed at −30° C., −40° C., −50° C., −60° C., −70° C., −80° C., −90° C., −100° C. or below. In a specific embodiment, the method is performed at a temperature of from −70° C. to −90° C., preferably of from −75° C. to −85° C., more preferably the method is performed at −80° C.

If the cooling is based on a mixture of dry ice and isopropyl alcohol, the method might be performed at about −77° C.

If the cooling is based on liquid nitrogen, the method might be performed at about −196° C.

In any case the temperature can nowadays be adjusted to more or less any specific chosen temperature by the use of appropriate cooling means which are known to the person skilled in the art.

The method may also be performed at varying temperatures to determine the suitability for the closure system for different storage and usage conditions. In such an embodiment, the method additionally comprises the step of varying the temperature.

In a specific embodiment, the invention relates to a method for testing the temperature dependence of the integrity of a closure system (12) closing a container (6) comprising the steps of:

(a) placing the closure system (12) of a container (6) into a chamber (1) of a container closure integrity test device (13) and sealing wall (15) of the chamber (1) against of the container (6), wherein the container (6) is closed with the closure system (12), and wherein the container is or can be filled for the test with a testing gas, and wherein the closure system (12) is prevented from contact with the wall (15) of the chamber (1);

(b) generating a pressure difference between the inside of the container (6) and the inside of sealed chamber (1);

(c) detecting the testing gas that passes the closure system (12);

wherein at any point of time of the method the temperature is controlled.

Preferably, the container (6) closed with the closure system (12), wherein the container is or can be filled for the test with a testing gas, is provided.

Preferably, the temperature of the chamber (1), of the casing (14), of the wall (15) or of the complete device (13), of the container (6), around the closure system (12) or of a combination thereof, is controlled.

The temperature in the method may be raised or lowered. In some embodiments, the temperature is lowered.

In some embodiments of the invention, the temperature is varied sequentially. In other embodiments the temperature is varied continuously. In a preferred embodiment, the temperature is varied continuously, with a linear change of temperature. In a specific embodiment, the temperature is continuously lowered with a linear rate.

The cooling or heating rate should be suitable to monitor changes in the amount of testing gas, passing the closure system. As such, the cooling or heating rate should not be too fast or the temperature and test gas leak detection might not correlate correctly.

In particular the method allows to identify the temperatures, which are safe for handling and storing the container without affecting the integrity of the closure system.

In particular the method allows to identify the temperature, at which the closure system is no longer safe.

This can be done done for example by measuring the amount of testing gas passing the closure system and determining the temperature at which a certain threshold of detected gas is passed.

In one embodiment, the method is done at a controlled temperature and the temperature is controlled by a liquid with a defined temperature, which is called LIQUTEMP herein.

LIQUTEMP may be any liquid which can be used as a carrier for heat or as a cooling medium and which may be used for cooling and/or heating devices, preferably for cooling devices. Suitable LIQUTEMPs are known to the person skilled in the art, such as water, isopropanol, Novec™ (of the 3M (Schweiz) GmbH, 8803 Rüschlikon, Switzerland), such as Novec™ 7200, Dowtherm™ (of Dow Europe GmbH, 8810 Horgen, Switzerland), and the like.

When the container (6) has been inserted into the device (13), then preferably a gap (24) is formed, which is located between the casing (14) and the container (6) and which is located on the side of the sealing means (3) which is opposite to the closure system (12).

The control of the temperature by LIQUTEMP is preferably done by passing LIQUTEMP through the casing (14), through the wall (15), through the complete device (13), through the gap (24), or through a combination thereof.

In one embodiment, the device (13) comprises or is able to connect to means for temperature control;

preferably, said means for temperature control are adapted to execute temperature control as described herein, also with all their embodiments.

The invention further relates to a device (13) as defined herein, also with all its embodiments, wherein the device (13) comprises means for temperature control.

Said means for temperature control can be means for cooling the device (13), for cooling the casing (14), and/or for cooling the wall (15). Preferably, said means for temperature control are means for temperature control by the use of LIQUTEMP;

more preferably, said means for temperature control are means for passing LIQUTEMP through the casing (14), through the wall (15), through the complete device (13), through the gap (24), or through a combination thereof.

Figure 6:
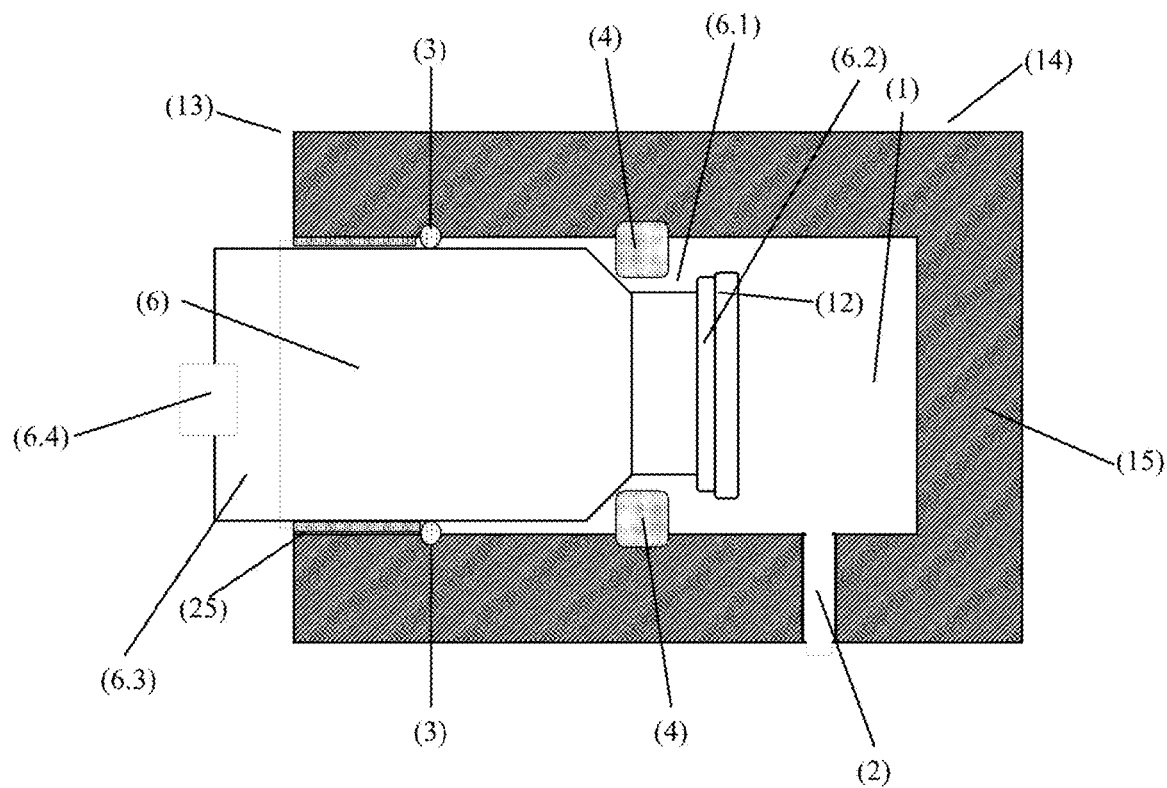
FIG. 6: Schematic drawing of a device according to the invention with addition of temperature-controlled liquid (25) in the gap (24) between device (13) and container (6).
Figure 8A:
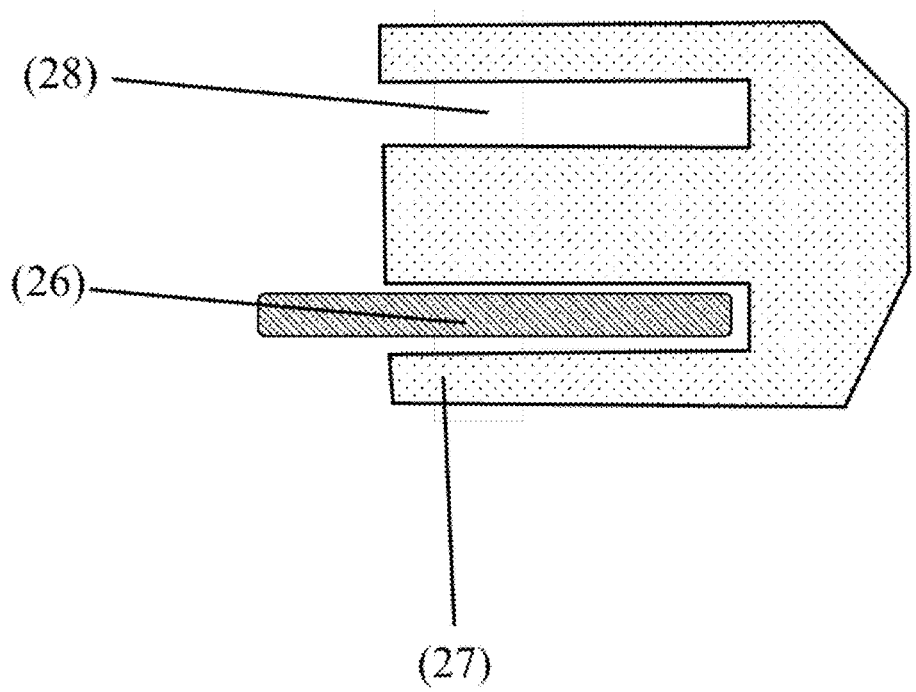
FIG. 8A, B: Schematic drawing of exemplary temperature sensor inserts for a container.
Figure 8B:
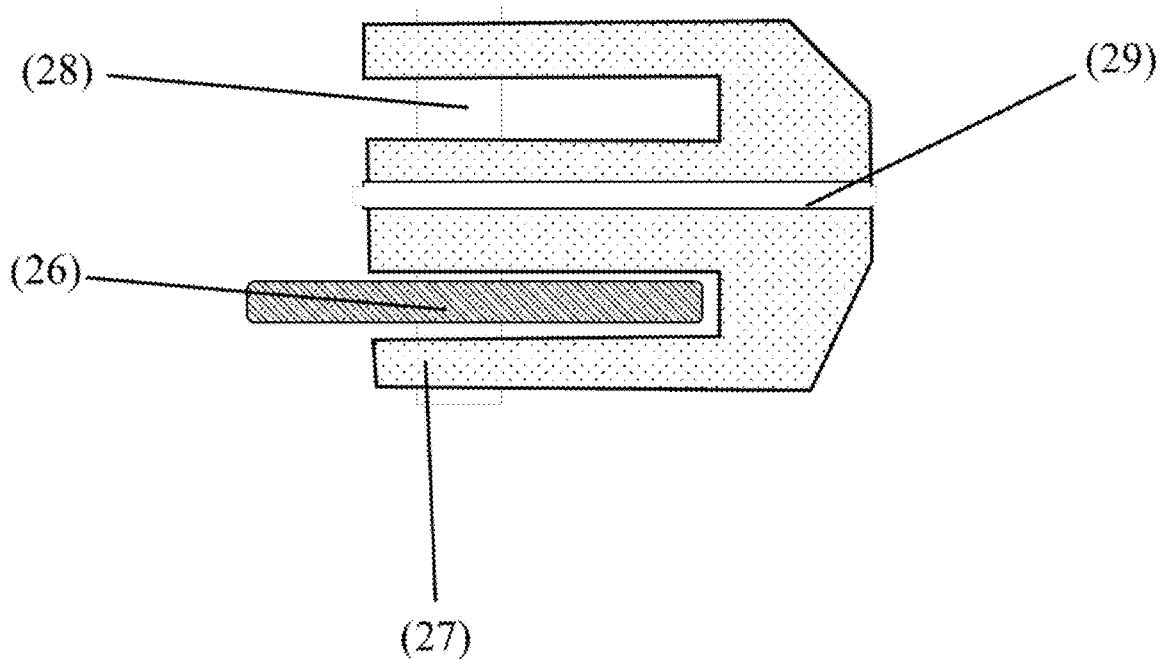
FIG. 8C: Photograph of an exemplary embodiment
FIG. 8D, E: Schematic drawing of an exemplary embodiment of the device of the invention utilizing a temperature sensor.
FIG. 8F: Schematic drawing of a device according to the invention using a temperature sensor in an external temperature controlling device.
FIG. 8G: Photograph of an exemplary embodiment.
Figure 8C:
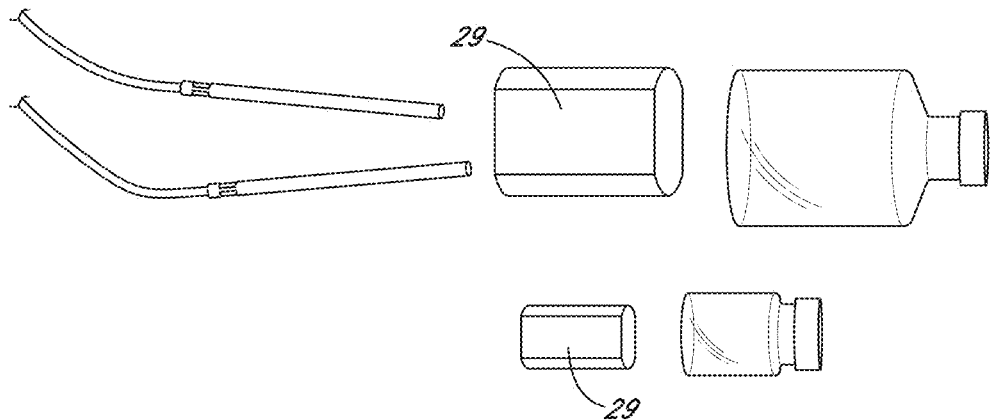
Figure 8D:
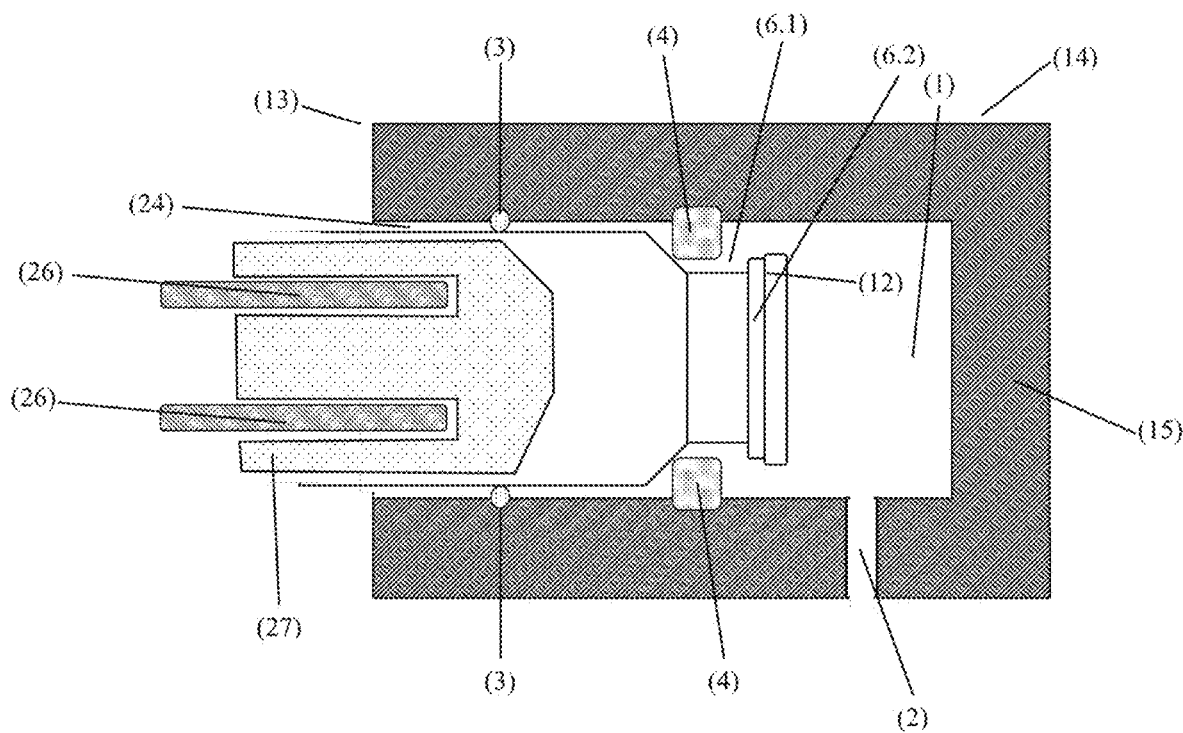
Figure 8E:
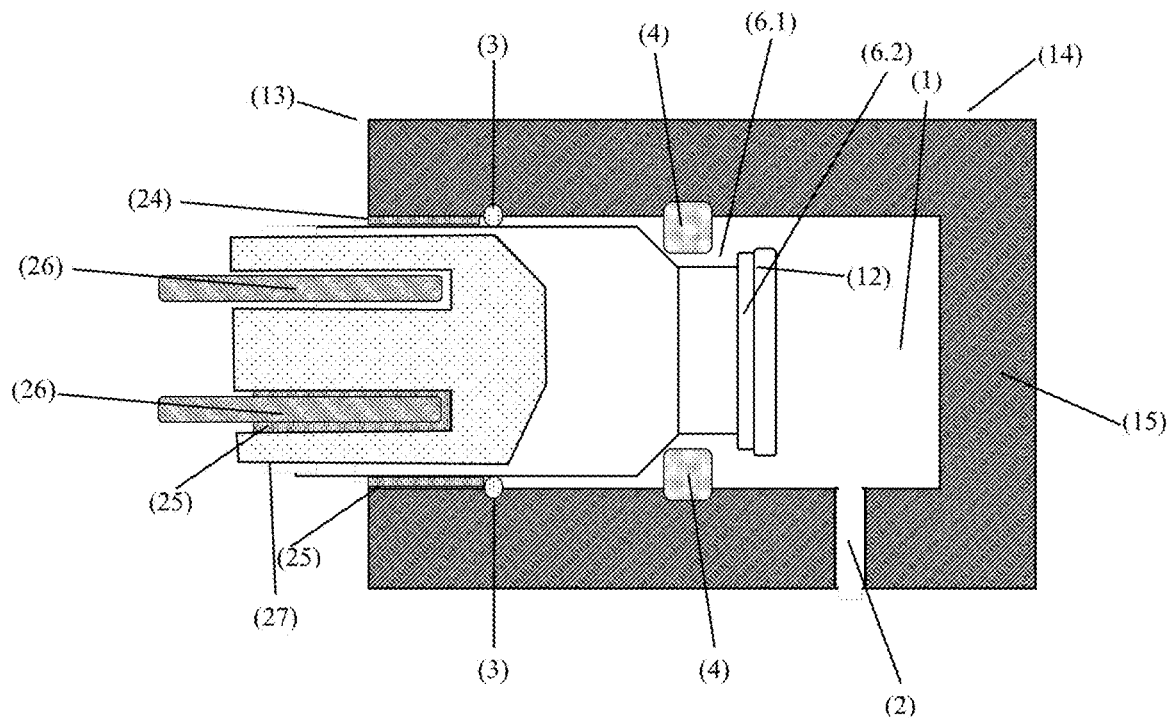
Figure 8F:
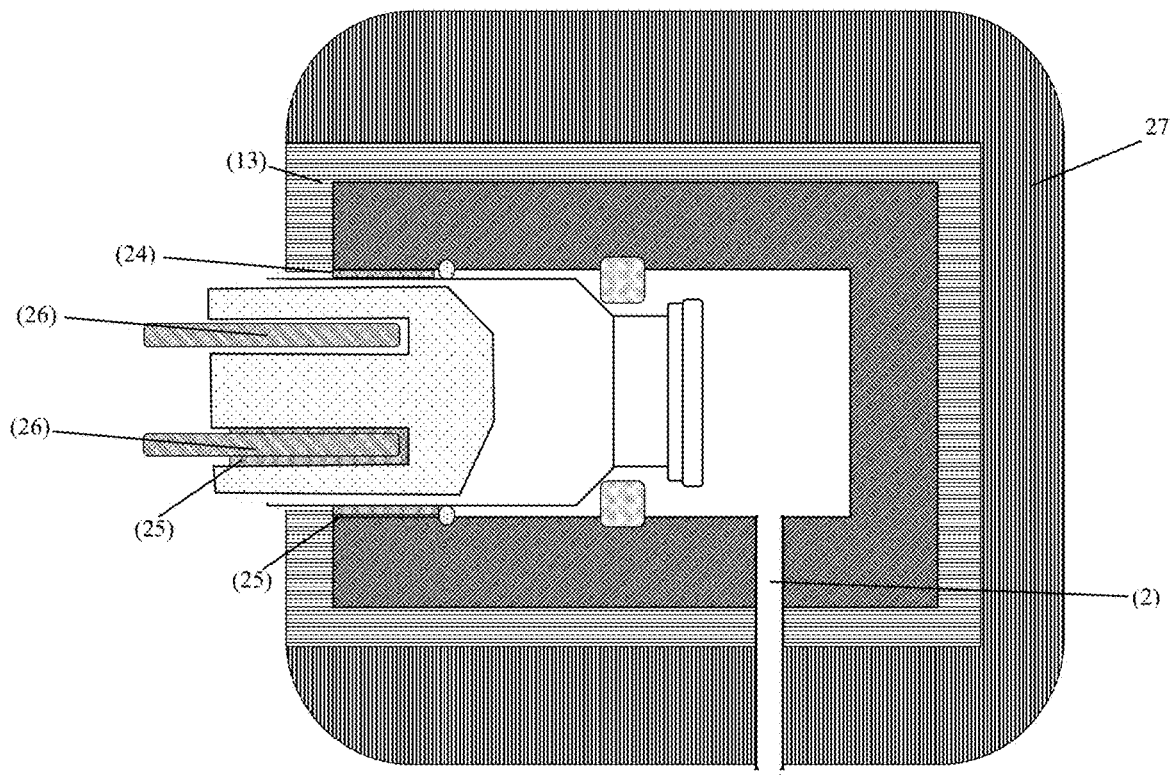
Figure 8G:
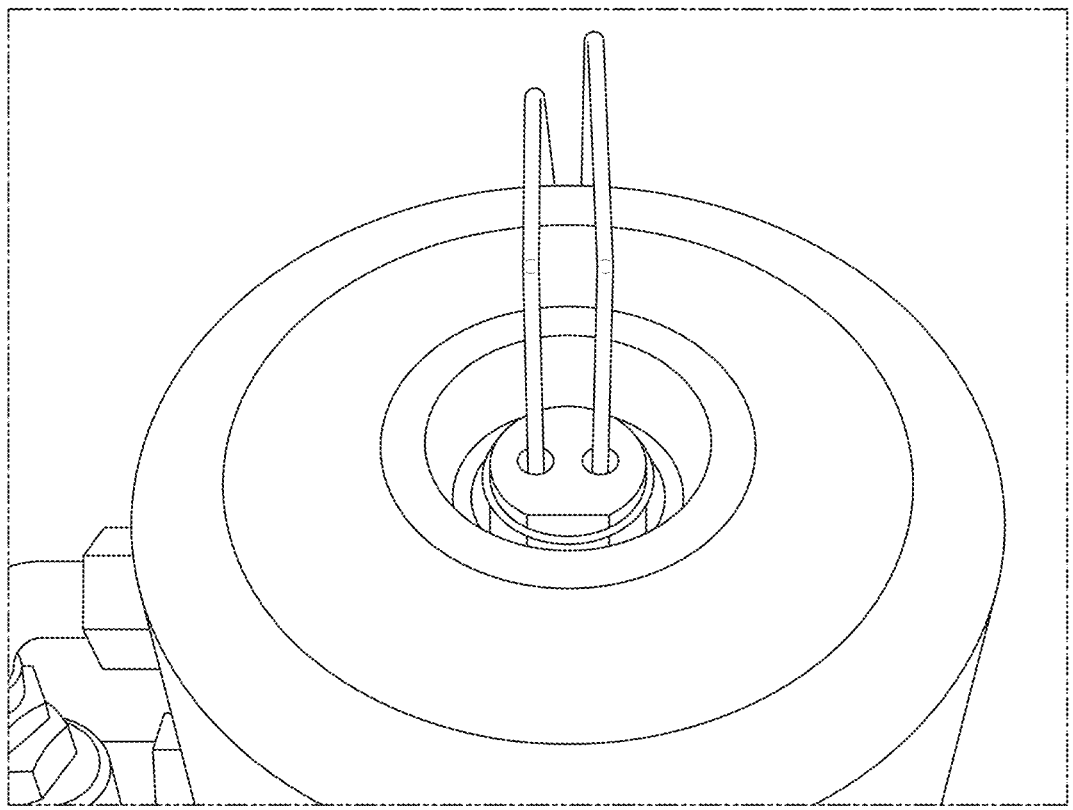

In some embodiments of the invention LIQUTEMP (25) is filled into said gap (24) of the device (13); see for example FIGS. 6, 8E and 8F. LIQUTEMP can also be only filled into gap (24) without any passing through gap (24); this may be done for example to facilitate the transfer of the temperature from the wall (15) to the wall of the vial (6).

In some embodiments, said means for temperature control can also be realized by means for external cooling of the device (13), for cooling the casing (14) or for cooling the wall (15), or for a combination thereof;

such as tubes or pipes which are in contact with the device (13), with the casing (14), with the wall (15) or with a combination thereof.

Said means for temperature control can also be realized by a separate device DEVCOOL (30) which is cooled and which is used for cooling the device (13), for example by inserting the device (13) into DEVCOOL.

In some embodiments, DEVCOOL is a double walled device. The double wall can be used to effect the temperature control, e.g. by passing LIQUTEMP through the double walled wall at the desired temperature, or by using the space built by the double wall as isolation. In some embodiments, device (13) can be inserted into DEVCOOL. The cooling effect can be transferred from DEVCOOL to device (13) by contact of the wall of device (13) with the double walled wall of DEVCOOL, or by other suitable means known to the person skilled in the art. Said contact between the wall of device (13) and the double walled wall of DEVCOOL may be direct contact or mediated contact, for example the mediated contact can be mediated by the use of LIQUTEMP.

Figure 7A:
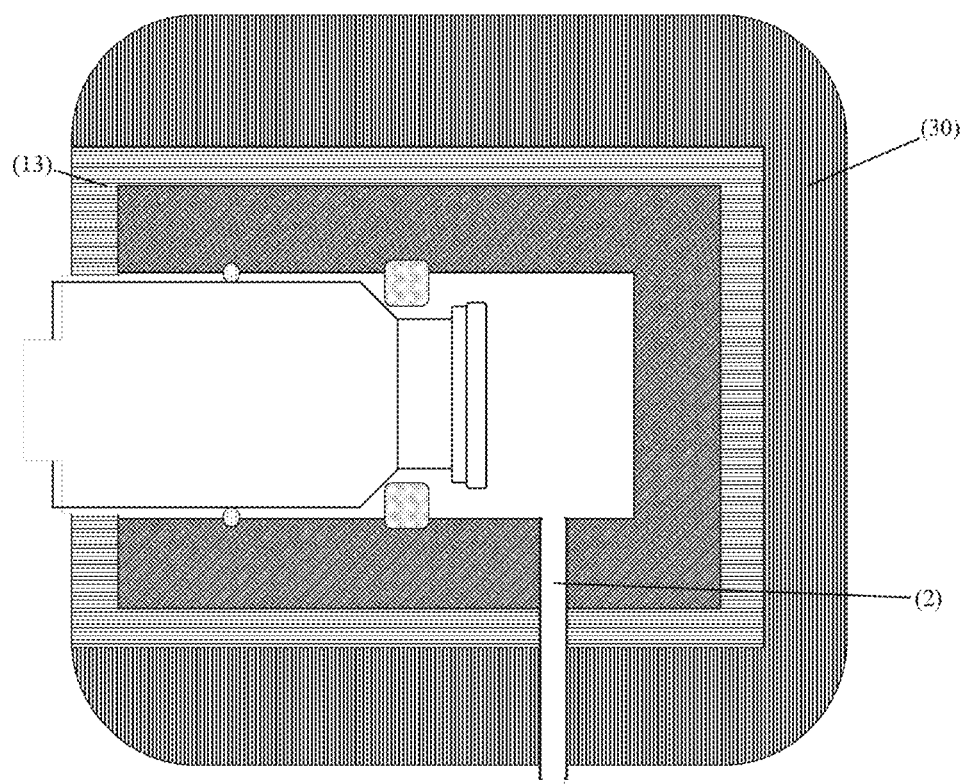
FIG. 7A: Schematic drawing of a device (13) according to the invention inserted into an external temperature controlling device DEVCOOL (30).
Figure 7B:
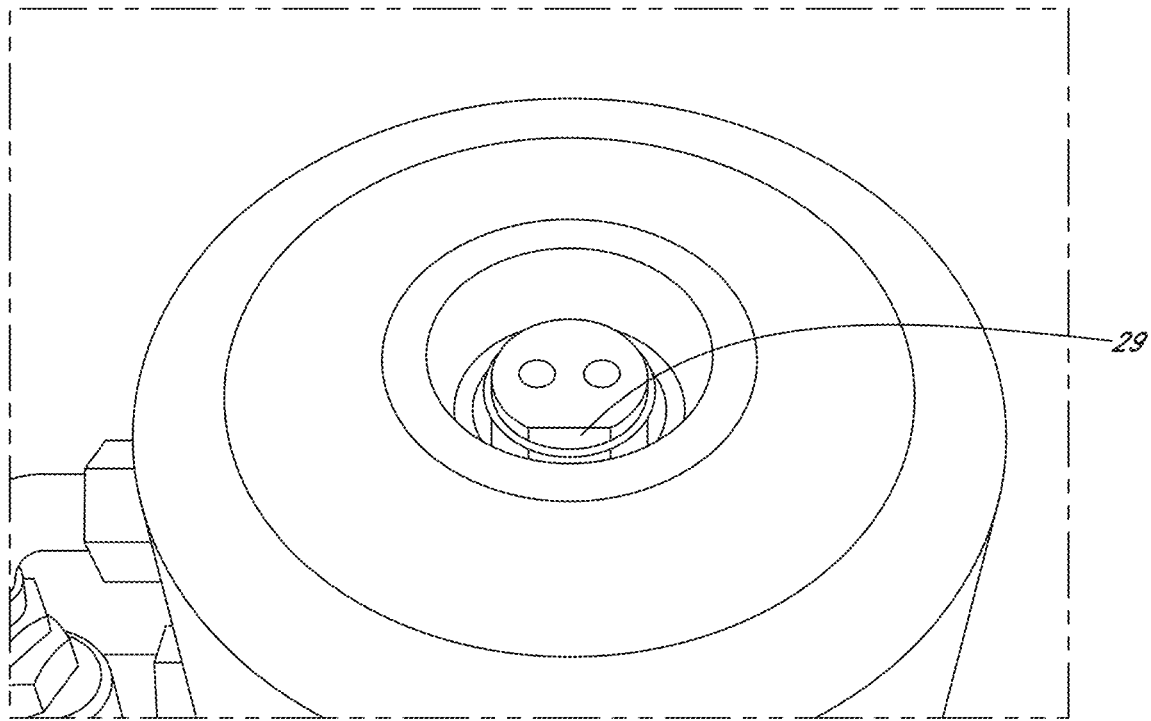
FIG. 7B: Photograph of exemplary embodiment.

A schematic view of a device (13) as defined herein inserted into a DEVCOOL (30) can be seen in FIG. 7A. FIG. 7B shows a photograph of an exemplary embodiment.

In one embodiment, device (13) comprises one or more temperature sensors (26) or has means for placing one or more temperature sensors into device (13).

In one embodiment, one or more temperature sensors can be placed in or are located in the container (6) or in the device (13) or in both.

The invention further relates to a temperature sensor for use with a device (13) as defined herein, also with all its embodiments.

In one embodiment, device (13) comprises or is used with a device DEVTEMP (27) for holding one or more temperature sensors (26) within the container (6);

preferably, DEVTEMP can be placed in or is located in the container (6).

The invention further relates to DEVTEMP for use with a device (13) as defined herein, also with all its embodiments.

A schematic example of DEVTEMP (27) can be seen in FIG. 8A. In general, a DEVTEMP (27) according to the invention comprises at least one opening (28), which allows the insertion of a temperature sensor (26). In some embodiments, DEVTEMP has a plurality of openings. In some embodiments DEVTEMP comprises at least one temperature sensor or has means for placing at least one temperature sensor into DEVTEMP.

Therefore another subject of the invention is a device DEVTEMP (27) adapted to a specific type of container (6), comprising means for measuring the temperature of DEVTEMP (27) and comprising at least one means for passing a testing gas into said container (6).

In some embodiments, said opening (28) can be filled with LIQUTEMP (25) to allow for accurate temperature measurement, for example when LIQUTEMP is filled in the opening (28) then LIQUTEMP mediates the passing of the temperature from DEVTEMP to a temperature sensor inserted in the opening (28).

DEVTEMP may be made from any suitable material but is preferably made of metal.

In a preferred embodiment, DEVTEMP is adapted to a specific type of container (6); the person skilled in the art is aware of possible adaptions to DEVTEMP to fit DEVTEMP to a container.

In some embodiments DEVTEMP is configured to be inserted into the container (see for example FIG. 8C or 8D);

DEVTEMP can also be configured to allow the testing gas to pass into the container. Therefore preferably DEVTEMP comprises means for passing a testing gas into the container.

In some embodiments, said means for passing a testing gas into a container is realized by shaping DEVTEMP in such a way that there remains a defined gap (29) or entrance (29) for the testing gas to pass into the container; in specific embodiments said entrance (29) is a hole in DEVTEMP.

Another subject of the invention is DEVTEMP adapted to a specific type of container (6) and comprising at least one opening (28) which allows the insertion of a temperature sensor and comprising at least one means for passing a testing gas into the container.

DEVTEMP may also comprises or can be connected to devices for temperature control. In some embodiments DEVTEMP may be connected with DEVCOOL; see for example FIGS. 8E and 8F. In some embodiments DEVTEMP comprises at least one temperature sensor, wherein said temperature sensor is connected with DEVCOOL.

The invention further relates to a computer program comprising instructions to cause the device (13) as described herein, also with all its embodiments, to perform any of the methods as described herein, also with all their embodiments.

Preferably, the computer program comprises instructions to cause the device (13), which comprises means for temperature control, said means for temperature control as defined herein, also with all their embodiment, to perform any of the methods as described herein, also with all their embodiments.

Preferably the device (13) as described herein, also with all its embodiments, is connected to a device with a detector for a testing gas and the computer program comprises instructions to cause the device (13) and the device with a detector for a testing gas to perform any of the methods as described herein, also with all their embodiments.

Preferably the device (13) as described herein, also with all its embodiments, is connected to a device with a detector for a testing gas and to a device for temperature control DEVCOOL and the computer program comprises instructions to cause the device (13), the device with a detector for a testing gas and DEVCOOL to perform any of the methods as described herein, also with all their embodiments.

The invention further relates to a computer-readable medium having stored thereon the computer program as defined herein, also with all its embodiments.

Further subject of the invention is the use of a method or a device as defined above to test the closure integrity of closure systems of pharmaceutical containers for sterile compositions.

In another embodiment of the invention the presence, for example the concentration, of testing gas in the container is detected, preferably during the test of the CCI. This can be done for example to verify or to make sure that actually testing gas is present in the container during the test of the CCI. This detection of the testing gas within the container can also be comprised in instructions of a computer program.

EXAMPLES

Example 1

Analysis of Container Closure Integrity of Different Containers with Closure Systems An ASM340 mass spectrometric helium leak detector (Pfeifer Vacuum, Asslar, Germany) was used to perform Helium leak measurements.

Vials were 50 mL standard tubing glass vials in analogy to DIN ISO 8362 sealed with a 20 mm rubber stopper with silicone coating. The rubber stopper was held in place by a 20 mm aluminum crimp cap with an overhanging plastic flip-off button. The vials had a nominal outer diameter of 42.5 mm with a total height of 73 mm. The opening of the vial had an inner diameter of 12.6 mm and an outer diameter of 20 mm.

In brief, a sealed 50 mL test vial was cut open at the bottom with a diamond blade. Then it was placed in an in-house manufactured testing device with an airtight round flange, which created a seal between the flange and the wall of the vial, thereby bringing the closure system of the vial and the helium leak detector in gaseous connection but sealed from the outside. This gaseous connection was evacuated by a vacuum pump and helium gas was applied on the bottom side of the vial. In this test setup the only path of the helium gas from the bottom side of the vial to the detector is through a leak of the closure system of the vials, that is at the sealing area of the vial opening, or through glass cracks at the vial head shoulder.

Copper wires of defined size were used to generate artificial leaks in the closure system.

Container closure integrity was measured using a default system, both without positioning means and with positioning means. The positioning means were in form of a ring (FIG. 4N) placed on the vial and enclosing and expending above of the closure system (see FIGS. 4J-4M). Thus, in one case the closure system was allowed to get in contact with the chamber wall, while in the case with positioning means, contact of the closure system with the wall was prevented by the ring.

The results of the analysis of sample vials are shown in tables 1 to 3 below.

AVG means average, STD means standard deviation.

TABLE 1

| sample vial | wire size [micrometer] | RSF [N] | Leak [mbar*L/s] without positioning means | Leak [mbar*L/s] with positioning means |
|---|---|---|---|---|
| 1 | 60 | 25.0 | 1.40E−03 | 5.20E−03 |
| 2 | 60 | 21.8 | 7.40E−04 | 3.90E−03 |
| 3 | 60 | 28.6 | 9.60E−04 | 4.60E−03 |
| 4 | 60 | 33.0 | 1.20E−03 | 4.70E−03 |
| 5 | 60 | 27.1 | 1.20E−03 | 5.40E−03 |
| 6 | 60 | 30.7 | 7.40E−04 | 6.70E−03 |
| 7 | 60 | 31.2 | 1.10E−03 | 4.00E−03 |
| 8 | 60 | 29.0 | 8.60E−04 | 5.40E−03 |
| 9 | 60 | 17.5 | 1.20E−03 | 6.60E−03 |
| 10 | 60 | 31.2 | 3.90E−04 | 2.60E−03 |
| AVG | | 27.5 | 9.79E−04 | 4.91E−03 |
| STD | | 4.8 | 3.01E−04 | 1.24E−03 |

TABLE 2

| sample vial | wire size [micrometer] | RSF [N] | Leak [mbar*L/s] without positioning means | Leak [mbar*L/s] with positioning means |
|---|---|---|---|---|
| 1 | 20 | 20.0 | 8.10E−05 | 1.80E−04 |
| 2 | 20 | 23.2 | 3.70E−05 | 3.80E−04 |
| 3 | 20 | 20.0 | 3.60E−05 | 1.40E−04 |
| 4 | 20 | 25.0 | 8.40E−05 | 1.80E−04 |
| 5 | 20 | 25.3 | 4.20E−05 | 1.60E−04 |
| 6 | 20 | 20.9 | 4.60E−05 | 2.80E−04 |
| 7 | 20 | 18.4 | 4.90E−05 | 2.80E−04 |
| 8 | 20 | 18.4 | 4.70E−05 | 2.30E−04 |
| 9 | 20 | 25.1 | 4.70E−05 | 2.20E−04 |
| 10 | 20 | 23.6 | 4.80E−05 | 3.80E−04 |
| AVG | | 22.0 | 5.17E−05 | 2.43E−04 |
| STD | | 2.8 | 1.69E−05 | 8.59E−05 |

TABLE 3

| sample vial | wire size [micrometer] | RSF [N] | Leak [mbar*L/s] without positioning means | Leak [mbar*L/s] with positioning means |
|---|---|---|---|---|
| 1 | 10 | 22.1 | < | < |
| 2 | 10 | 20.6 | 7.90E−06 | 8.80E−06 |
| 3 | 10 | 36.2 | 8.20E−06 | 3.10E−06 |
| 4 | 10 | 23.4 | 9.30E−06 | 1.10E−05 |
| 5 | 10 | 23.8 | 9.80E−06 | 5.50E−06 |
| 6 | 10 | 25.4 | 5.90E−06 | 1.50E−05 |
| 7 | 10 | 21.2 | 1.60E−05 | 2.30E−05 |
| 8 | 10 | 22.4 | 6.70E−06 | 1.60E−05 |
| 9 | 10 | 20.6 | 3.40E−06 | 5.50E−06 |
| 10 | 10 | 16.4 | 2.60E−06 | 2.50E−06 |
| AVG | | 23.2 | 7.76E−06 | 1.00E−05 |
| STD | | 5.2 | 3.95E−06 | 6.86E−06 |

The average helium leak rate for ten tested 50 mL vials with a 10 micrometer wire artificial leak without the invention was $7.76 \cdot 10^{-6}$ mbar*L/s (see table 3). In contrast, the average helium leak rate for ten tested 50 mL vials with a 10 micrometer wire artificial leak using the invention was $1.00 \cdot 10^{-5}$ mbar*L/s. The helium leak rate for the measurements without the invention was smaller, because the closure system was pressed against the flange resulting in manipulation of the closure system, namely a high rubber stopper compression.

The US Pharmacopeia Chapter 1207 (USP<1207>, Package Integrity Evaluation-Sterile Products. pp 1700-1707) proposes an acceptance criterion of $6 \cdot 10^{-6}$ mbar*L/s. Any closure system with a helium leak rate below $6 \cdot 10^{-6}$ mbar*L/s can be considered as tight and prevent microbial ingress. In table 3, for vial 6 the helium leak rate without the invention was $5.90 \cdot 10^{-6}$ mbar*L/s and with the invention $1.5 \cdot 10^{-5}$ mbar*L/s. In other words, the vials were tested as being in conformity with the USP recommendation without the invention and in non-conformity when measured as with using positioning means.

In general, the method shows that nearly all vials show a reduced He-leak rate compared with a measurement using the positioning means, showing that the measurement is affected by contact of the closure system with the wall of the device, the contact was induced by the vacuum pressure, which sucked the vial with the closure system against the wall of the device.

Example 2

Container Closure System Integrity Analysis with Controlled Temperature

In a further experiment the influence of temperature on a container closure integrity system was analyzed. A sealed vial as described in example 1 was used.

The vial was prepared as described in example 1 but without introduction of artificial leaks. The measurement was performed as described in example 1 while additionally the temperature around the closure system was controlled using a temperature control device DEVTEMP; see FIG. 7. The temperature was determined using a device as shown in FIGS. 8A, 8C to 8G.

As described above, the gap (24), which was located between the casing (14) and the container (6), that was the vial, and which was located on the side of the sealing means (3) which was opposite to the closure system (12), was filled with NOVEC™ 7200 to facilitate the transfer of the temperature from the wall (15) to the wall of the vial (6) and from there to DEVTEMP (27).

DEVTEMP (27) had two openings (28), in each opening one temperature sensor (26) was inserted. The remaining space in one of the two openings (28) was filled with NOVEC™ 7200, the remaining space in the other opening (28) was filled with water.

DEVCOOL (30) was a double walled device into which the device (13) was inserted.

The experiment was done using a computer program comprising instructions to control the device (13), the device for temperature control DEVCOOL (30), i.e. the double walled device, the device DEVTEMP (27) and the temperature sensors, and the detector for detecting the helium as testing gas.

The specific embodiment, which was used in this experiment, is shown in FIGS. 7B, 8C and 8G, 10A to 10D.

The measurement was performed at a temperature range of +20° C. to −80° C., the cooling rate was ca. −2.3° C. per minute.

Figure 9:
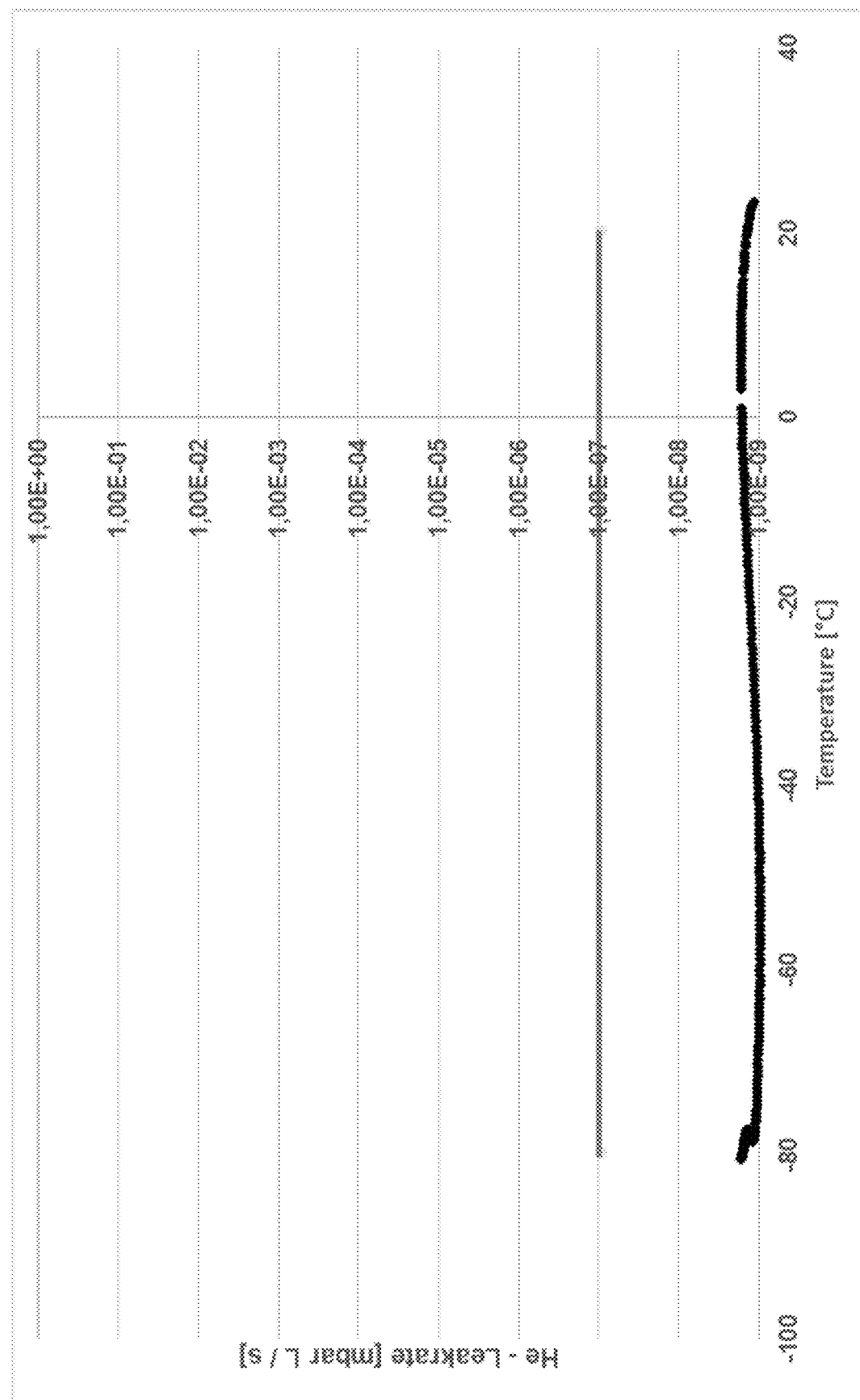
FIG. 9: Measurement results of a sealed vial. Measurement was performed at a temperature range of +20° C. to −80° C. Black dots: He leak rate at respective temperature; grey line: selected threshold.
Figure 10A:
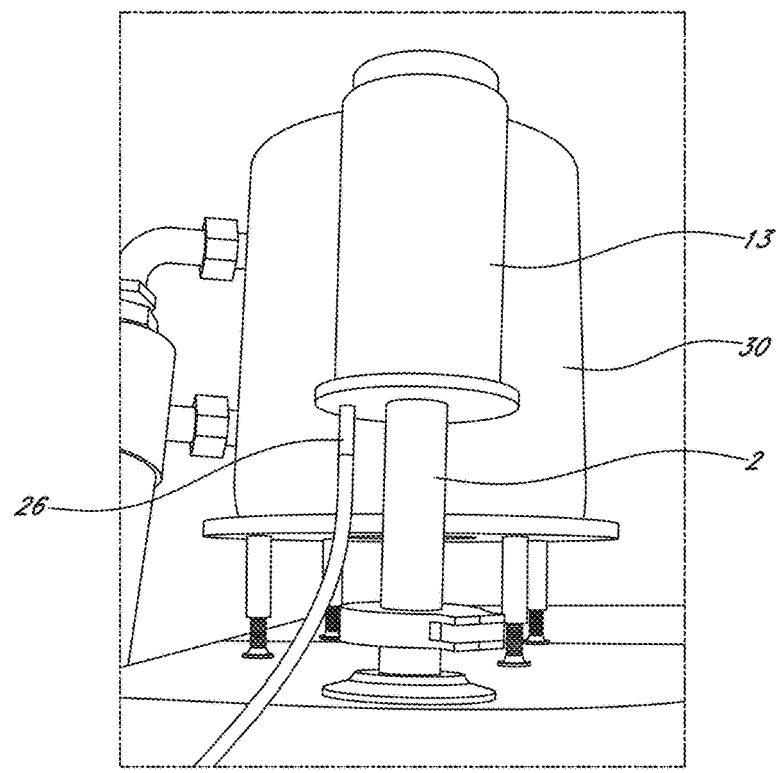
FIG. 10A, 10B, 10C 10D: Photograph of specific embodiment.
Figure 10B:
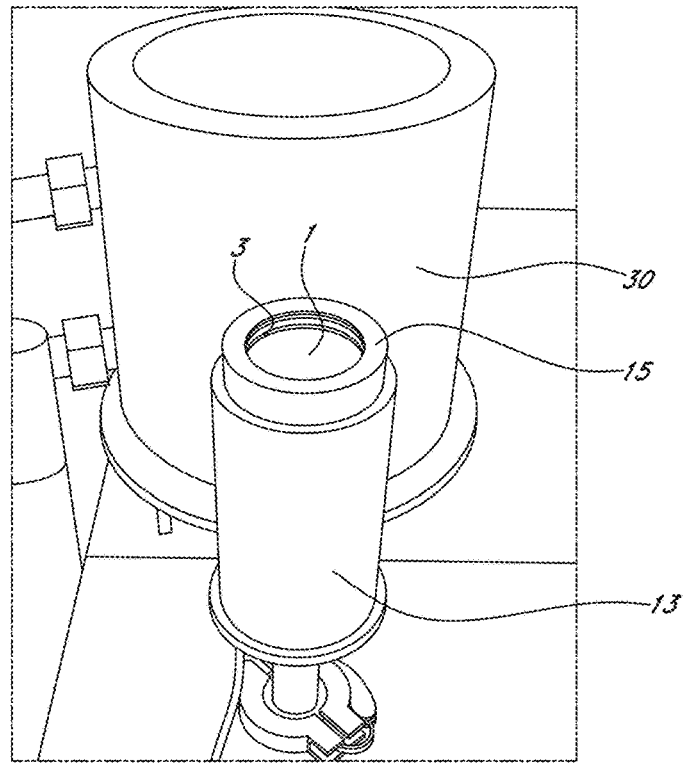
Figure 10C:
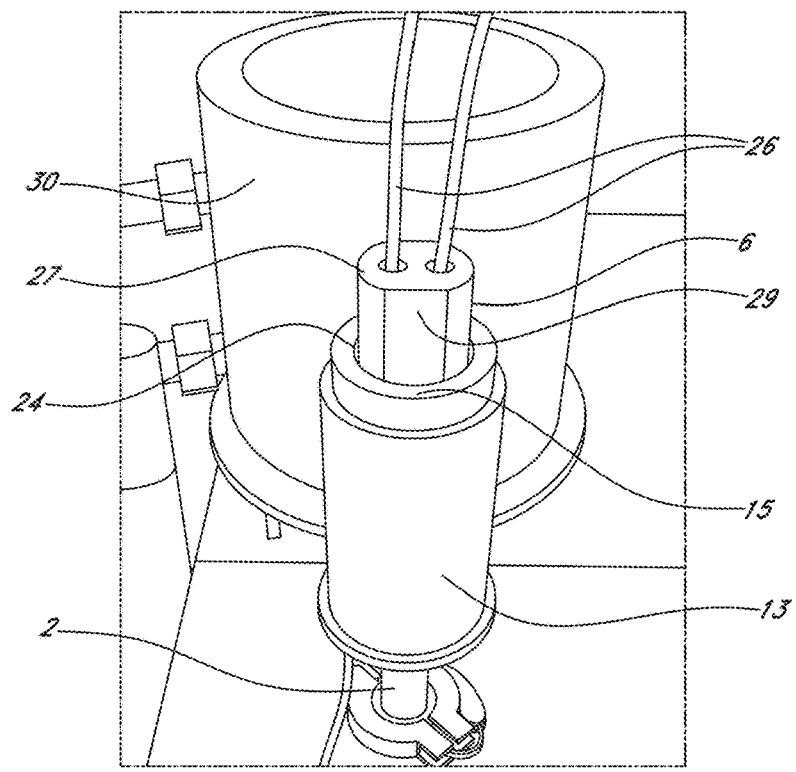
Figure 10D:
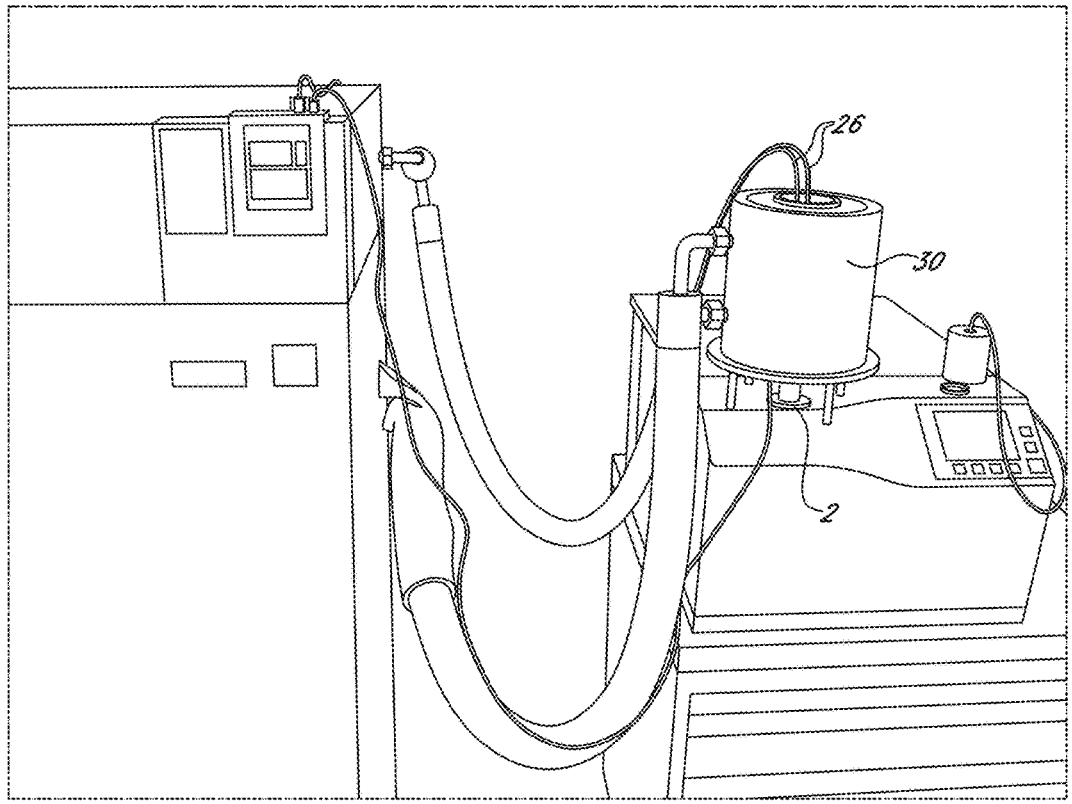

The data values generated in the example are graphically shown in FIG. 9. It is clearly visible that the temperature affects the He-leak rate (black dots) and thus also the closure integrity, however, with a correctly sealed vial the leak rate remains below a predetermined threshold (gray line).

The data values generated in the example are listed in Table 4.

TABLE 4

| time [s] | He leak [mbar L/s] | Temperature [° C.] |
| --- | --- | --- |
| 22.48 | 8.44E−09 | 22.56 |
| 32.48 | 6.09E−09 | 22.57 |
| 42.52 | 5.00E−09 | 22.57 |
| 52.54 | 4.17E−09 | 22.57 |
| 62.5 | 3.57E−09 | 22.57 |
| 72.54 | 3.26E−09 | 22.57 |
| 82.54 | 2.88E−09 | 22.58 |
| 92.69 | 2.63E−09 | 22.59 |
| 102.64 | 2.43E−09 | 22.58 |
| 112.62 | 2.25E−09 | 22.59 |
| 122.61 | 2.13E−09 | 22.6 |
| 132.61 | 1.99E−09 | 22.61 |
| 142.64 | 1.89E−09 | 22.61 |
| 152.67 | 1.79E−09 | 22.62 |
| 162.61 | 1.71E−09 | 22.63 |
| 172.61 | 1.64E−09 | 22.63 |
| 182.83 | 1.58E−09 | 22.64 |
| 192.74 | 1.53E−09 | 22.65 |
| 202.67 | 1.50E−09 | 22.66 |
| 212.7 | 1.45E−09 | 22.67 |
| 222.68 | 1.41E−09 | 22.68 |
| 232.79 | 1.37E−09 | 22.69 |
| 242.78 | 1.33E−09 | 22.7 |
| 252.78 | 1.30E−09 | 22.7 |
| 262.84 | 1.28E−09 | 22.72 |
| 272.96 | 1.25E−09 | 22.72 |
| 282.82 | 1.23E−09 | 22.74 |
| 292.81 | 1.21E−09 | 22.75 |
| 302.84 | 1.20E−09 | 22.76 |
| 312.84 | 1.18E−09 | 22.77 |
| 322.87 | 1.16E−09 | 22.79 |
| 332.89 | 1.15E−09 | 22.79 |
| 342.94 | 1.15E−09 | 22.82 |
| 352.94 | 1.13E−09 | 22.83 |
| 362.92 | 1.12E−09 | 22.85 |
| 373.06 | 1.12E−09 | 22.86 |
| 382.98 | 1.12E−09 | 22.87 |
| 393 | 1.11E−09 | 22.88 |
| 403.15 | 1.11E−09 | 22.9 |
| 413.09 | 1.10E−09 | 22.91 |
| 423.03 | 1.10E−09 | 22.92 |
| 433.17 | 1.11E−09 | 22.94 |
| 443.19 | 1.11E−09 | 22.95 |
| 453.09 | 1.11E−09 | 22.97 |
| 463.09 | 1.11E−09 | 22.99 |
| 473.09 | 1.11E−09 | 23 |
| 483.14 | 1.11E−09 | 23.01 |
| 493.12 | 1.12E−09 | 23.02 |
| 503.15 | 1.13E−09 | 23.03 |
| 513.17 | 1.13E−09 | 23.04 |
| 523.34 | 1.14E−09 | 23.05 |
| 533.2 | 1.14E−09 | 23.06 |
| 543.19 | 1.15E−09 | 23.07 |
| 553.25 | 1.16E−09 | 23.14 |
| 563.25 | 1.16E−09 | 23.15 |
| 573.23 | 1.17E−09 | 23.17 |
| 583.37 | 1.18E−09 | 23.19 |
| 593.33 | 1.19E−09 | 23.21 |
| 603.29 | 1.21E−09 | 23.22 |
| 613.34 | 1.20E−09 | 23.21 |
| 623.34 | 1.22E−09 | 23.19 |
| 633.58 | 1.22E−09 | 23.16 |
| 653.42 | 1.26E−09 | 22.99 |
| 663.4 | 1.28E−09 | 22.9 |
| 673.4 | 1.28E−09 | 22.78 |
| 683.45 | 1.30E−09 | 22.66 |
| 693.35 | 1.33E−09 | 22.53 |
| 703.57 | 1.35E−09 | 22.39 |
| 713.42 | 1.35E−09 | 22.24 |
| 733.41 | 1.39E−09 | 21.89 |
| 743.46 | 1.39E−09 | 21.69 |
| 753.53 | 1.40E−09 | 21.49 |
| 763.48 | 1.41E−09 | 21.27 |
| 783.51 | 1.46E−09 | 20.78 |
| 793.54 | 1.48E−09 | 20.51 |
| 803.57 | 1.49E−09 | 20.24 |
| 813.51 | 1.50E−09 | 19.96 |

TABLE 4-continued

| time [s] | He leak [mbar L/s] | Temperature [° C.] |
| --- | --- | --- |
| 823.57 | 1.52E−09 | 19.66 |
| 833.57 | 1.53E−09 | 19.36 |
| 853.67 | 1.56E−09 | 18.71 |
| 863.53 | 1.58E−09 | 18.37 |
| 883.62 | 1.61E−09 | 17.68 |
| 893.61 | 1.62E−09 | 17.32 |
| 903.61 | 1.63E−09 | 16.96 |
| 913.6 | 1.63E−09 | 16.56 |
| 923.6 | 1.65E−09 | 16.19 |
| 933.61 | 1.67E−09 | 15.81 |
| 943.67 | 1.68E−09 | 15.41 |
| 963.66 | 1.70E−09 | 14.61 |
| 973.65 | 1.72E−09 | 14.19 |
| 983.65 | 1.72E−09 | 13.78 |
| 993.72 | 1.72E−09 | 13.36 |
| 1003.72 | 1.73E−09 | 12.94 |
| 1013.77 | 1.75E−09 | 12.52 |
| 1023.72 | 1.75E−09 | 12.1 |
| 1033.77 | 1.75E−09 | 11.68 |
| 1043.77 | 1.78E−09 | 11.26 |
| 1053.89 | 1.77E−09 | 10.84 |
| 1063.89 | 1.77E−09 | 10.42 |
| 1074.03 | 1.78E−09 | 10 |
| 1083.8 | 1.78E−09 | 9.58 |
| 1093.87 | 1.78E−09 | 9.16 |
| 1103.86 | 1.79E−09 | 8.74 |
| 1113.91 | 1.77E−09 | 8.32 |
| 1123.91 | 1.78E−09 | 7.9 |
| 1134.08 | 1.78E−09 | 7.48 |
| 1144.01 | 1.79E−09 | 7.06 |
| 1153.98 | 1.80E−09 | 6.64 |
| 1163.97 | 1.79E−09 | 6.22 |
| 1173.97 | 1.78E−09 | 5.8 |
| 1184.01 | 1.80E−09 | 5.38 |
| 1194 | 1.78E−09 | 4.96 |
| 1204.06 | 1.77E−09 | 4.54 |
| 1214.06 | 1.77E−09 | 4.12 |
| 1224.07 | 1.77E−09 | 3.7 |
| 1234.07 | 1.78E−09 | 3.28 |
| 1244.26 | 1.78E−09 | 2.86 |
| 1254.2 | 1.77E−09 | 0.67 |
| 1264.24 | 1.75E−09 | 0.14 |
| 1274.15 | 1.75E−09 | −0.39 |
| 1284.13 | 1.74E−09 | −0.93 |
| 1294.17 | 1.74E−09 | −1.47 |
| 1304.21 | 1.72E−09 | −2.01 |
| 1314.31 | 1.72E−09 | −2.55 |
| 1324.21 | 1.71E−09 | −3.09 |
| 1334.2 | 1.72E−09 | −3.62 |
| 1344.24 | 1.69E−09 | −4.17 |
| 1354.27 | 1.68E−09 | −4.73 |
| 1364.26 | 1.68E−09 | −5.27 |
| 1374.3 | 1.67E−09 | −5.82 |
| 1384.3 | 1.65E−09 | −6.36 |
| 1394.43 | 1.65E−09 | −6.92 |
| 1404.43 | 1.65E−09 | −7.46 |
| 1414.36 | 1.64E−09 | −8.01 |
| 1424.29 | 1.61E−09 | −8.55 |
| 1434.31 | 1.61E−09 | −9.12 |
| 1444.36 | 1.61E−09 | −9.68 |
| 1454.53 | 1.58E−09 | −10.25 |
| 1464.44 | 1.58E−09 | −10.8 |
| 1474.4 | 1.58E−09 | −11.35 |
| 1484.4 | 1.55E−09 | −11.91 |
| 1494.36 | 1.54E−09 | −12.47 |
| 1504.4 | 1.54E−09 | −13.03 |
| 1514.4 | 1.51E−09 | −13.57 |
| 1524.49 | 1.52E−09 | −14.15 |
| 1534.42 | 1.50E−09 | −14.71 |
| 1544.41 | 1.48E−09 | −15.26 |
| 1554.41 | 1.48E−09 | −15.83 |
| 1564.47 | 1.48E−09 | −16.39 |
| 1574.46 | 1.44E−09 | −16.94 |
| 1584.46 | 1.44E−09 | −17.51 |
| 1594.5 | 1.43E−09 | −18.08 |
| 1604.54 | 1.42E−09 | −18.64 |
| 1614.49 | 1.40E−09 | −19.2 |

TABLE 4-continued

| time [s] | He leak [mbar L/s] | Temperature [° C.] |
| --- | --- | --- |
| 1624.5 | 1.40E−09 | −19.77 |
| 1634.54 | 1.39E−09 | −20.32 |
| 1644.55 | 1.37E−09 | −20.9 |
| 1654.56 | 1.36E−09 | −21.47 |
| 1664.51 | 1.35E−09 | −22.01 |
| 1674.55 | 1.34E−09 | −22.58 |
| 1684.55 | 1.33E−09 | −23.15 |
| 1694.59 | 1.31E−09 | −23.71 |
| 1704.63 | 1.30E−09 | −24.27 |
| 1714.61 | 1.30E−09 | −24.83 |
| 1724.64 | 1.29E−09 | −25.39 |
| 1734.63 | 1.28E−09 | −25.95 |
| 1744.67 | 1.28E−09 | −26.51 |
| 1754.67 | 1.26E−09 | −27.08 |
| 1764.66 | 1.25E−09 | −27.63 |
| 1774.7 | 1.25E−09 | −28.21 |
| 1784.86 | 1.23E−09 | −28.76 |
| 1794.75 | 1.23E−09 | −29.31 |
| 1804.8 | 1.22E−09 | −29.87 |
| 1814.8 | 1.21E−09 | −30.43 |
| 1824.83 | 1.20E−09 | −31 |
| 1834.82 | 1.19E−09 | −31.56 |
| 1844.93 | 1.19E−09 | −32.12 |
| 1854.91 | 1.18E−09 | −32.68 |
| 1864.98 | 1.17E−09 | −33.24 |
| 1874.97 | 1.16E−09 | −33.81 |
| 1885 | 1.15E−09 | −34.37 |
| 1894.91 | 1.14E−09 | −34.93 |
| 1904.91 | 1.15E−09 | −35.5 |
| 1915 | 1.14E−09 | −36.05 |
| 1925.05 | 1.14E−09 | −36.62 |
| 1935.11 | 1.12E−09 | −37.18 |
| 1944.98 | 1.11E−09 | −37.73 |
| 1955 | 1.11E−09 | −38.3 |
| 1964.99 | 1.11E−09 | −38.85 |
| 1975.02 | 1.09E−09 | −39.42 |
| 1985.04 | 1.10E−09 | −39.99 |
| 1995.07 | 1.09E−09 | −40.53 |
| 2005.07 | 1.08E−09 | −41.08 |
| 2015.11 | 1.08E−09 | −41.64 |
| 2025.08 | 1.07E−09 | −42.18 |
| 2035.14 | 1.07E−09 | −42.75 |
| 2045.08 | 1.07E−09 | −43.27 |
| 2055.08 | 1.07E−09 | −43.82 |
| 2065.07 | 1.07E−09 | −44.35 |
| 2075.1 | 1.06E−09 | −44.9 |
| 2085.11 | 1.05E−09 | −45.43 |
| 2095.15 | 1.04E−09 | −45.98 |
| 2105.14 | 1.04E−09 | −46.5 |
| 2115.13 | 1.04E−09 | −47.03 |
| 2125.08 | 1.03E−09 | −47.56 |
| 2135.31 | 1.03E−09 | −48.1 |
| 2145.16 | 1.03E−09 | −48.61 |
| 2155.16 | 1.04E−09 | −49.14 |
| 2165.2 | 1.04E−09 | −49.67 |
| 2175.19 | 1.03E−09 | −50.18 |
| 2185.19 | 1.03E−09 | −50.71 |
| 2195.23 | 1.02E−09 | −51.23 |
| 2205.22 | 1.02E−09 | −51.76 |
| 2215.2 | 1.02E−09 | −52.27 |
| 2225.24 | 1.02E−09 | −52.77 |
| 2235.25 | 1.02E−09 | −53.3 |
| 2245.29 | 1.02E−09 | −53.81 |
| 2255.26 | 1.01E−09 | −54.32 |
| 2265.28 | 1.02E−09 | −54.82 |
| 2275.28 | 1.02E−09 | −55.35 |
| 2285.22 | 1.01E−09 | −55.85 |
| 2295.26 | 1.01E−09 | −56.36 |
| 2305.3 | 1.02E−09 | −56.87 |
| 2315.43 | 1.02E−09 | −57.39 |
| 2325.32 | 1.02E−09 | −57.93 |
| 2335.3 | 1.03E−09 | −58.49 |
| 2345.34 | 1.02E−09 | −59.05 |
| 2355.48 | 1.03E−09 | −59.64 |
| 2365.36 | 1.04E−09 | −60.21 |
| 2375.36 | 1.03E−09 | −60.79 |
| 2385.33 | 1.03E−09 | −61.37 |
| 2395.47 | 1.03E−09 | −61.93 |
| 2405.42 | 1.04E−09 | −62.48 |
| 2415.41 | 1.04E−09 | −62.98 |
| 2425.39 | 1.03E−09 | −63.42 |
| 2435.38 | 1.05E−09 | −63.83 |
| 2445.41 | 1.05E−09 | −64.22 |
| 2455.45 | 1.05E−09 | −64.65 |
| 2465.44 | 1.05E−09 | −65.07 |
| 2475.57 | 1.06E−09 | −65.55 |
| 2485.51 | 1.06E−09 | −66.04 |
| 2495.49 | 1.06E−09 | −66.53 |
| 2505.48 | 1.07E−09 | −67 |
| 2515.48 | 1.06E−09 | −67.47 |
| 2525.47 | 1.06E−09 | −67.97 |
| 2535.5 | 1.08E−09 | −68.46 |
| 2545.49 | 1.08E−09 | −68.95 |
| 2555.48 | 1.08E−09 | −69.42 |
| 2565.53 | 1.09E−09 | −69.9 |
| 2575.65 | 1.11E−09 | −70.36 |
| 2585.48 | 1.10E−09 | −70.82 |
| 2595.6 | 1.10E−09 | −71.27 |
| 2605.58 | 1.10E−09 | −71.69 |
| 2615.68 | 1.11E−09 | −72.13 |
| 2625.65 | 1.11E−09 | −72.53 |
| 2635.63 | 1.11E−09 | −72.94 |
| 2645.82 | 1.13E−09 | −73.32 |
| 2655.75 | 1.13E−09 | −73.7 |
| 2665.75 | 1.12E−09 | −74.07 |
| 2675.71 | 1.13E−09 | −74.42 |
| 2685.74 | 1.12E−09 | −74.77 |
| 2695.74 | 1.14E−09 | −75.1 |
| 2705.78 | 1.15E−09 | −75.44 |
| 2715.77 | 1.16E−09 | −75.75 |
| 2725.77 | 1.16E−09 | −76.05 |
| 2735.92 | 1.16E−09 | −76.36 |
| 2745.98 | 1.17E−09 | −76.64 |
| 2755.94 | 1.18E−09 | −76.9 |
| 2766 | 1.18E−09 | −77.15 |
| 2775.98 | 1.19E−09 | −77.38 |
| 2785.98 | 1.19E−09 | −77.61 |
| 2795.89 | 1.21E−09 | −77.8 |
| 2805.93 | 1.21E−09 | −77.98 |
| 2815.92 | 1.22E−09 | −78.14 |
| 2825.92 | 1.23E−09 | −78.28 |
| 2835.95 | 1.23E−09 | −78.41 |
| 2845.95 | 1.25E−09 | −78.51 |
| 2855.98 | 1.24E−09 | −78.6 |
| 2865.98 | 1.26E−09 | −78.67 |
| 2876.07 | 1.26E−09 | −78.72 |
| 2886.01 | 1.27E−09 | −78.76 |
| 2896.06 | 1.28E−09 | −78.79 |
| 2906.06 | 1.28E−09 | −78.79 |
| 2916.09 | 1.28E−09 | −78.79 |
| 2926.09 | 1.29E−09 | −78.77 |
| 2936.16 | 1.30E−09 | −78.75 |
| 2946.08 | 1.31E−09 | −78.71 |
| 2956.15 | 1.31E−09 | −78.66 |
| 2966.15 | 1.32E−09 | −78.6 |
| 2976.18 | 1.33E−09 | −78.55 |
| 2986.14 | 1.34E−09 | −78.48 |
| 2996.14 | 1.35E−09 | −78.41 |
| 3006.1 | 1.34E−09 | −78.32 |
| 3016.14 | 1.36E−09 | −78.26 |
| 3026.15 | 1.36E−09 | −78.18 |
| 3036.19 | 1.38E−09 | −78.09 |
| 3046.18 | 1.39E−09 | −78.02 |
| 3056.18 | 1.38E−09 | −77.94 |
| 3066.17 | 1.39E−09 | −77.87 |
| 3076.21 | 1.40E−09 | −77.8 |
| 3086.21 | 1.40E−09 | −77.74 |
| 3096.23 | 1.43E−09 | −77.69 |
| 3106.23 | 1.43E−09 | −77.64 |
| 3116.24 | 1.42E−09 | −77.61 |
| 3126.21 | 1.45E−09 | −77.57 |
| 3136.27 | 1.44E−09 | −77.54 |
| 3146.27 | 1.47E−09 | −77.54 |
| 3156.26 | 1.46E−09 | −77.53 |

TABLE 4-continued

| time [s] | He leak [mbar L/s] | Temperature [° C.] |
|---|---|---|
| 3166.3 | 1.46E-09 | -77.54 |
| 3176.31 | 1.48E-09 | -77.54 |
| 3186.27 | 1.49E-09 | -77.56 |
| 3196.32 | 1.51E-09 | -77.6 |
| 3206.31 | 1.51E-09 | -77.63 |
| 3216.35 | 1.51E-09 | -77.68 |
| 3226.34 | 1.52E-09 | -77.74 |
| 3236.34 | 1.53E-09 | -77.8 |
| 3246.35 | 1.54E-09 | -77.87 |
| 3256.49 | 1.56E-09 | -77.96 |
| 3266.37 | 1.55E-09 | -78.04 |
| 3276.36 | 1.56E-09 | -78.13 |
| 3286.44 | 1.57E-09 | -78.23 |
| 3296.48 | 1.58E-09 | -78.34 |
| 3306.47 | 1.59E-09 | -78.44 |
| 3316.44 | 1.61E-09 | -78.53 |
| 3326.53 | 1.61E-09 | -78.66 |
| 3336.5 | 1.61E-09 | -78.77 |
| 3346.51 | 1.63E-09 | -78.89 |
| 3356.56 | 1.64E-09 | -79 |
| 3366.54 | 1.64E-09 | -79.11 |
| 3376.61 | 1.65E-09 | -79.23 |
| 3386.79 | 1.65E-09 | -79.35 |
| 3396.59 | 1.64E-09 | -79.46 |
| 3406.6 | 1.68E-09 | -79.58 |
| 3416.65 | 1.69E-09 | -79.69 |
| 3426.63 | 1.70E-09 | -79.78 |
| 3436.68 | 1.68E-09 | -79.89 |
| 3446.7 | 1.72E-09 | -79.99 |
| 3456.63 | 1.71E-09 | -80.08 |
| 3466.87 | 1.72E-09 | -80.18 |
| 3476.87 | 1.74E-09 | -80.24 |
| 3486.91 | 1.74E-09 | -80.32 |
| 3496.91 | 1.75E-09 | -80.39 |
| 3506.91 | 1.75E-09 | -80.45 |
| 3516.77 | 1.76E-09 | -80.52 |
| 3526.82 | 1.77E-09 | -80.55 |
| 3536.83 | 1.78E-09 | -80.61 |
| 3546.83 | 1.79E-09 | -80.63 |
| 3556.85 | 1.79E-09 | -80.65 |
| 3566.89 | 1.80E-09 | -80.67 |
| 3576.83 | 1.81E-09 | -80.69 |
| 3586.88 | 1.82E-09 | -80.69 |

The invention claimed is:

1. A device for testing the integrity of a closure system of a container, the container having a top portion comprising a main opening and a bottom portion, wherein the main opening is closed by the closure system, the device comprising
   (a) a casing having a wall forming a chamber into which at least the top portion of the container is insertable;
   b) sealing means adapted to seal at least a portion of the chamber against the container if the container or the top portion thereof is inserted;
   the sealing means divide the device and the chamber into an upstream portion, which is above the sealing means and where the top portion is located, and into a downstream portion, which is below the sealing means and where the bottom portion is located;
   (c) an outlet in the wall of the casing of the upstream portion of the chamber for allowing an efflux of a gas from the upstream portion of the chamber;
   characterized in that the device comprises positioning means for preventing contact between a top end of the closure system and a top part of the wall of the device when the top portion of the container is inserted into the chamber of the device;
   wherein the positioning means and sealing means are two separate means and the positioning means are located in the upstream portion of the chamber.

2. The device according to claim 1, wherein the device comprises means for temperature control.

3. The device according to claim 2, wherein the means for temperature control are adapted to execute temperature control.

4. The device according to claim 3, wherein said temperature control comprises heating and/or cooling.

5. The device according to claim 3, wherein said means for temperature control are means for passing a LIQUTEMP through the casing, through the wall, through the complete device, through a gap, or through a combination thereof.

6. The device according to claim 1, wherein a portion of the wall is adapted to function as the positioning means.

7. The device according to claim 1, wherein the positioning means is an integral part of the device.

8. The device according to claim 1, wherein the positioning means is a part which is removable from the device and can be placed on the container.

9. The device according to claim 1, wherein the positioning means comprises at least one stopper.

10. The device according to claim 1, wherein the positioning means is a stopper and wherein the stopper is integral to the wall of the device.

11. The device according to claim 1, wherein the positioning means is made of the same material as the sealing means.

12. The device according to claim 11, wherein said material is a flexible material.

13. The device according to claim 1, wherein the positioning means is made from a rigid material.

14. The device according to claim 1, wherein the device is connected to a detector.

15. The device according to claim 1, wherein the device comprises two casings, the casing into which the container or the top portion of the container is inserted, and a second casing, which can be connected to the casing.

16. The device according to claim 15, wherein the second casing comprises an inlet for a testing gas.

17. The device according to claim 1, wherein the device comprises one or more temperature sensors or has means for placing one or more temperature sensors into the device.

18. A method for testing the integrity of a closure system closing a container, wherein the container includes a top portion comprising a main opening and a bottom portion, wherein the main opening is closed by the closure system, a device for testing the integrity of a closure system comprising:
   (a) a casing having a wall forming a chamber into which at least the top portion of the container is insertable;
   b) sealing means adapted to seal at least a portion of the chamber against the container if the container or the top portion thereof is inserted;
   the sealing means divide the device and the chamber into an upstream portion, which is above the sealing means and where the top portion is located, and into a downstream portion, which is below the sealing means and where the bottom portion is located;
   (c) an outlet in the wall of the casing of the upstream portion of the chamber for allowing an efflux of a gas from the upstream portion of the chamber;
   characterized in that the device comprises positioning means for preventing contact between a top end of the closure system and the top part of the wall of the device when the top portion of the container is inserted into the chamber of the device;

wherein the positioning means and sealing means are two separate means and the positioning means are located in the upstream portion of the chamber,
wherein the method comprises the steps of:
providing the container closed with the closure system,
(a) placing the closure system of the container into a chamber of a container closure integrity test device and sealing the wall of the chamber against the container,
wherein the container is or can be filled for the test with a testing gas, and
wherein the closure system is prevented from contact with the wall of the chamber by the positioning means;
(b) generating a pressure difference between the inside of the container and the inside of the sealed chamber;
(c) detecting the testing gas that passes the closure system.

19. The method according to claim 18, wherein the container comprises an additional opening, wherein the additional opening is located in a further chamber, and wherein in said further chamber a constant pressure of the testing gas is maintained.

20. The method according to claim 19, wherein the constant pressure is atmospheric pressure.

21. The method according to claim 18, wherein the testing gas is helium.

22. The method according to claim 18, wherein the temperature is controlled in the method.

23. The method according to claim 22, wherein the temperature of the chamber, of the casing, of the wall, of the complete device, of the container, around the closure system or of a combination thereof, is controlled.

24. The method according to claim 22, wherein temperature control comprises lowering the temperature.

25. The method according to claim 18, wherein the method is performed at −30° C. or below.

26. A computer readable medium having stored thereon a computer program comprising instructions to cause the device to perform the method as defined in claim 18.

* * * * *